United States Patent
Whittam et al.

(10) Patent No.: US 12,537,193 B2
(45) Date of Patent: Jan. 27, 2026

(54) ELECTROACTIVE MATERIALS FOR METAL-ION BATTERIES

(71) Applicant: NEXEON LIMITED, Abingdon (GB)

(72) Inventors: Joshua Whittam, Oxfordshire (GB); Christopher Friend, Oxfordshire (GB); Charles Mason, Oxfordshire (GB); Mauro Chiacchia, Oxfordshire (GB); Silo Meoto, Oxfordshire (GB)

(73) Assignee: NEXEON LIMITED, Abingdon (GB)

( * ) Notice: Subject to any disclaimer, the term of this patent is extended or adjusted under 35 U.S.C. 154(b) by 0 days.

(21) Appl. No.: 18/703,285

(22) PCT Filed: Oct. 21, 2022

(86) PCT No.: PCT/GB2022/052693
§ 371 (c)(1),
(2) Date: Apr. 19, 2024

(87) PCT Pub. No.: WO2023/067359
PCT Pub. Date: Apr. 27, 2023

(65) Prior Publication Data
US 2025/0118739 A1  Apr. 10, 2025

(30) Foreign Application Priority Data

Oct. 21, 2021 (GB) .................................. 2115162.6

(51) Int. Cl.
*H01M 4/04* (2006.01)
*H01M 4/38* (2006.01)
*H01M 4/62* (2006.01)
*H01M 4/02* (2006.01)

(52) U.S. Cl.
CPC ........... *H01M 4/386* (2013.01); *H01M 4/625* (2013.01); *H01M 4/626* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 10,508,335 B1 | 12/2019 | Yilmaz et al. | |
| 2019/0051892 A1* | 2/2019 | Yushin | .................. H01G 11/32 |
| 2020/0020935 A1 | 1/2020 | Costantino et al. | |

FOREIGN PATENT DOCUMENTS

| | | |
|---|---|---|
| JP | 2016132608 | 7/2016 |
| JP | 2020514231 | 5/2020 |
| KR | 20190122805 | 10/2019 |
| KR | 20210118087 | 9/2021 |
| WO | WO-2007083155 A1 | 7/2007 |
| WO | 2018165610 | 9/2018 |
| WO | WO-2020095067 A1 | 5/2020 |
| WO | 2020128523 | 6/2020 |
| WO | WO-2020128495 A1 | 6/2020 |
| WO | 2021048555 | 3/2021 |
| WO | WO-2022072715 A1 | 4/2022 |

OTHER PUBLICATIONS

"Japanese Application No. 2024-523387, Office Action dated Nov. 19, 2024", w English Translation, 10 pages.
"International Application No. PCT/GB2022/052693, International Search Report dated Jan. 23, 2023", (Jan. 23, 2023), 3 pgs.
"International Application No. PCT/GB2022/052693, Written Opinion dated Jan. 23, 2023", (Jan. 23, 2023), 4 pgs.
Winter, Martin, et al., "Insertion electrode materials for rechargeable lithium batteries", Advanced materials 10.10, (1998), 725-763.
"British Application No. 2115162.6, Notification of Grant dated Apr. 16, 2024", (Apr. 16, 2024), 2 pgs.
"Chinese Application No. 202280070265.1, Office Action dated Sep. 19, 2024", w English Translation, (Sep. 19, 2024), 11 pgs.
"Korean Application No. 10-2024-7016097, Office Action dated Oct. 10, 2024", w English Translation, (Oct. 10, 2024), 32 pgs.

* cited by examiner

*Primary Examiner* — Austin Murata
(74) *Attorney, Agent, or Firm* — Schwegman Lundberg & Woessner, P.A.

(57) ABSTRACT

The invention relates to a particulate material and processes for the preparation thereof. The particulate material consists of a plurality of composite particles. The composite particles comprise a porous particle framework comprising micropores and/or mesopores. The total pore volume of micropores and mesopores as measured by gas adsorption is in the range from 0.4 to 2.2 cm$^3$/g. The composite particles comprise a plurality of electroactive material domains and a plurality of modifier material domains disposed within the internal pore volume of the porous particle framework. At least a portion of the modifier material domains are located between adjacent electroactive material domains.

20 Claims, 1 Drawing Sheet

[electroactive material domain(s)]
[modifier material domain(s)]
[electroactive material domain(s)]

ELECTROACTIVE MATERIALS FOR METAL-ION BATTERIES

PRIORITY APPLICATIONS

This application is a U.S. National Stage Filing under 35 U.S.C. § 371 from International Application No. PCT/GB2022/052693, filed on Oct. 21, 2022, and published as WO2023/067359 on Apr. 27, 2023, which claims the benefit of priority to British Application No. 2115162.6, filed on Oct. 21, 2021; the benefit of priority of each of which is hereby claimed herein, and which applications and publication are hereby incorporated herein by reference in their entireties.

This invention relates in general to electroactive materials that are suitable for use in electrodes for rechargeable metal-ion batteries, and more specifically to particulate materials having high electrochemical capacities that are suitable for use as anode active materials in rechargeable metal-ion batteries.

Rechargeable metal-ion batteries are widely used in portable electronic devices such as mobile telephones and laptops and are finding increasing application in electric or hybrid vehicles. Rechargeable metal-ion batteries generally comprise an anode in the form of a metal current collector provided with a layer of an electroactive material, defined herein as a material which is capable of inserting and releasing metal ions during the charging and discharging of a battery. The terms "cathode" and "anode" are used herein in the sense that the battery is placed across a load, such that the anode is the negative electrode. When a metal-ion battery is charged, metal ions are transported from the metal-ion-containing cathode layer via the electrolyte to the anode and are inserted into the anode material. The term "battery" is used herein to refer both to a device containing a single anode and a single cathode and to devices containing a plurality of anodes and/or a plurality of cathodes.

There is interest in improving the gravimetric and/or volumetric capacities of rechargeable metal-ion batteries. To date, commercial lithium-ion batteries have largely been limited to the use of graphite as an anode active material. When a graphite anode is charged, lithium intercalates between the graphite layers to form a material with the empirical formula $Li_xC_6$ (wherein x is greater than 0 and less than or equal to 1). Consequently, graphite has a maximum theoretical capacity of 372 mAh/g in a lithium-ion battery, with a practical capacity that is somewhat lower (ca. 340 to 360 mAh/g). Other materials, such as silicon, tin and germanium, are capable of intercalating lithium with a significantly higher capacity than graphite but have yet to find widespread commercial use due to difficulties in maintaining sufficient capacity over numerous charge/discharge cycles.

Silicon in particular has been identified as a promising alternative to graphite for the manufacture of rechargeable metal-ion batteries having high gravimetric and volumetric capacities because of its very high capacity for lithium (see, for example, Insertion Electrode Materials for Rechargeable Lithium Batteries, Winter, M. et al. in Adv. Mater. 1998, 10, No. 10). At room temperature, silicon has a theoretical maximum specific capacity in a lithium-ion battery of about 3,600 mAh/g (based on $Li_{15}Si_4$). However, the intercalation of lithium into bulk silicon leads to a large increase in the volume of the silicon material of up to 400% of its original volume when silicon is lithiated to its maximum capacity. Repeated charge-discharge cycles cause significant mechanical stress in the silicon material, resulting in fracturing and delamination of the silicon anode material. Volume contraction of silicon particles upon delithiation can result in a loss of electrical contact between the anode material and the current collector. A further difficulty is that the solid electrolyte interphase (SEI) layer that forms on the silicon surface does not have sufficient mechanical tolerance to accommodate the expansion and contraction of the silicon. As a result, newly exposed silicon surfaces lead to further electrolyte decomposition and increased thickness of the SEI layer and irreversible consumption of lithium. These failure mechanisms collectively result in an unacceptable loss of electrochemical capacity over successive charging and discharging cycles.

A number of approaches have been proposed to overcome the problems associated with the volume change observed when charging silicon-containing anodes. It has been reported that fine silicon structures below around 150 nm in cross-section, such as silicon films and silicon nanoparticles are more tolerant of volume changes on charging and discharging when compared to silicon particles in the micron size range. However, neither of these is suitable for commercial scale applications in their unmodified form; nanoscale particles are difficult to prepare and handle and silicon films do not provide sufficient bulk capacity.

WO 2007/083155 discloses that improved capacity retention may be obtained with silicon particles having high aspect ratio, i.e. the ratio of the largest dimension to the smallest dimension of the particle. The small cross-section of such particles reduces the structural stress on the material due to volumetric changes on charging and discharging. However, such particles may be difficult and costly to manufacture and can be fragile. In addition, high surface area may result in excessive SEI formation, resulting in excessive loss of capacity on the first charge-discharge cycle.

It is also known in general terms that electroactive materials such as silicon may be deposited within the pores of a porous carrier material, such as an activated carbon material. These composite materials provide some of the beneficial charge-discharge properties of nanoscale silicon particles while avoiding the handling difficulties of nanoparticles. Guo et al. (Journal of Materials Chemistry A, 2013, pp. 14075-14079) discloses a silicon-carbon composite material in which a porous carbon substrate provides an electrically conductive framework with silicon nanoparticles deposited within the pore structure of the substrate with uniform distribution. It is shown that the composite material has improved capacity retention over multiple charging cycles, however the initial capacity of the composite material in mAh/g is significantly lower than for silicon nanoparticles.

The present inventors have previously reported the development of a class of electroactive materials having a composite structure in which nanoscale electroactive materials, such as silicon, are deposited into the pore network of a highly porous conductive particulate material, e.g. a porous carbon material. For example, WO 2020/095067 and WO 2020/128495 report that the improved electrochemical performance of these materials can be attributed to the way in which the electroactive materials are located in the porous material in the form of small domains with dimensions of the order of a few nanometres or less. These fine electroactive structures are thought to have a lower resistance to elastic deformation and higher fracture resistance than larger electroactive structures, and are therefore able to lithiate and delithiate without excessive structural stress. As a result, the electroactive materials exhibit good reversible capacity retention over multiple charge-discharge cycles. Secondly, by controlling the loading of silicon within the porous carbon framework such that only part of the pore volume is occupied by silicon in the uncharged state, the unoccupied pore volume of the porous carbon framework is able to accommodate a substantial amount of silicon expansion internally. Furthermore, by locating nanoscale electroactive material domains within small mesopores and/or micropores as described above, only a small area of the electroactive material surface is accessible to electrolyte and so SEI formation is limited. Additional exposure in subsequent charge-discharge cycles is substantially prevented such that the role of SEI formation as a failure mechanism leading to capacity loss is significantly reduced. This stands in clear contrast to the excessive SEI formation that characterizes the material disclosed by Guo, for example (see above).

The materials described in WO 2020/095067 and WO 2020/128495 have been synthesized by chemical vapour infiltration (CVI) in different reactor systems (static, rotary and FBR). The porous conductive particles are contacted with a flow of a silicon-containing precursor (CVI), typically silane gas, at atmospheric pressure and at temperatures between 400 to 700° C. until the required amount of silicon is deposited into micropores and small mesopores. The deposition of silicon is carried out in a single step (single step deposition). Although carrying out deposition of silicon in a single step is convenient, this provides little control over the length scale of silicon being deposited. It is believed that the deposition of coarser silicon domains results in reduced reversible capacity retention due to excessive structural stress and uncontrolled SEI formation on subsequent charge-discharge cycles.

There is therefore a need in the art for electroactive material-containing composite particles which overcome the drawbacks of composite particles obtained from prior single step and multistep deposition processes.

BRIEF DESCRIPTION OF DRAWINGS

FIG. 1 shows the assembly of material domains within a single pore space according to embodiments of the present invention.

DETAILED DESCRIPTION

In a first aspect, the invention provides a particulate material consisting of a plurality of composite particles, wherein the composite particles comprise:
(a) a porous particle framework comprising micropores and/or mesopores, wherein the total pore volume of micropores and mesopores as measured by gas adsorption is in the range from 0.4 to 2.2 $cm^3/g$;
(b) a plurality of electroactive material domains and a plurality of modifier material domains disposed within the internal pore volume of the porous particle framework, wherein at least a portion of the modifier material domains are located between adjacent electroactive material domains.

The invention therefore relates in general terms to a composite particulate material comprising a plurality of electroactive material (e.g. silicon) domains within the pore network of porous particles. The porous particles therefore form a framework for the electroactive material domains. As used herein, the term "electroactive material domain" refers to a body of electroactive material, e.g. elemental silicon, having maximum dimensions that are determined by the dimensions of the micropores and/or mesopores of the porous particles in which they are located. The electroactive domains may therefore be described as nanoscale electroactive domains, wherein the term "nanoscale" is understood to refer generally to dimensions less than 100 nm. Although, due to the dimensions of micropores and mesopores, the electroactive material domains typically have maximum dimensions in any direction of less than 50 nm, and usually significantly less than 50 nm. A domain may for example take the form of a regular or irregular particle or a bounded layer or region of coating. The electroactive material domains are present in combination with modifier material domains, wherein at least a portion of the modifier material domains are located between adjacent electroactive material domains. The plurality of electroactive material domains may be discrete electroactive material domains. The electroactive material domains may comprise (or consist of) amorphous electroactive material or crystalline electroactive material.

A number of different factors contribute to the improved performance of these materials when compared to materials comprising similar porous particle frameworks, but wherein the modifier material is absent. The modifier material is able to act as a barrier that effectively prevents discrete domains of electroactive material from increasing in size as more electroactive material is deposited within the porous particles, e.g. in further deposition steps. The modifier material therefore caps the length scale of deposited electroactive material, allowing further depositions of electroactive material to form discrete electroactive material domains. Therefore, composite particles having both the desired electroactive material loading and desired length scale of electroactive material domains are obtained. Furthermore, the modifier material is able to reduce the exposed surface area of the electroactive material domains and thus minimise SEI formation and oxidation of the electroactive material surface. In addition, the modifier material effectively prevents exposure of the electroactive material to electrolyte and therefore SEI formation is reduced. During long-term cycling of the composite materials, the structure of the composite particles can be disrupted, opening up voids and channels leading to exposure of electroactive surfaces previously located within closed pore spaces. This problem is exacerbated if the composite materials are cycled at higher temperatures, when reaction energies are enhanced, from repeated volume changes and chemical interactions with electrolyte solvents and other cell components. Adding a modifier material protects the surface of the electroactive material domains, thus reduces the amount of degradation that may occur in such scenarios. The modifier material may also act as a conductive component, for example a conductive carbon layer (such as a hydrocarbon passivation layer or nitride passivation layer) may be used as the modifier material, acting as a conductivity enhancer located throughout the internal volume of the composite particles. This is believed to further improve the cycling efficiencies and to improve the rate performance of the composite.

The porous particle framework comprises a three-dimensionally interconnected open pore network comprising micropores and/or mesopores and optionally a minor volume of macropores. In accordance with conventional IUPAC terminology, the term "micropore" is used herein to refer to pores of less than 2 nm in diameter, the term "mesopore" is used herein to refer to pores of 2-50 nm in diameter, and the term "macropore" is used to refer to pores of greater than 50 nm diameter.

References herein to the volume of micropores, mesopores and macropores in the porous particle framework, and also any references to the distribution of pore volume within the porous particle framework, shall be understood to relate to the internal pore volume of the porous particle framework taken in isolation (i.e. in the form of porous particles prior to the deposition the electroactive material and modifier material). References herein to the BET surface area of the porous particle framework shall also be understood to relate to the BET surface area of the porous particle framework taken in isolation.

The porous particle framework is characterised by a total volume of micropores and mesopores (i.e. the total pore volume in the range from 0 to 50 nm) in the range from 0.4 to 2.2 cm$^3$/g. Typically, the porous particle framework includes both micropores and mesopores. However, it is not excluded that porous particle frameworks may be used which include micropores and no mesopores, or mesopores and no micropores.

More preferably, the total volume of micropores and mesopores in the porous particle framework is at least 0.45 cm$^3$/g, or at least 0.5 cm$^3$/g, at least 0.55 cm$^3$/g, or at least 0.6 cm$^3$/g, or at least 0.65 cm$^3$/g, or at least 0.7 cm$^3$/g, or at least 0.75 cm$^3$/g, or at least 0.8 cm$^3$/g, at least 0.85 cm$^3$/g, or at least 0.9 cm$^3$/g, or at least 0.95 cm$^3$/g, or at least 1 cm$^3$/g. The use of high porosity frameworks may be advantageous since it allows a larger amount of silicon to be accommodated within the pore structure.

The internal pore volume of the porous particle framework is suitably capped at a value at which increasing fragility of the porous particle framework outweighs the advantage of increased pore volume accommodating a larger amount of silicon. Preferably, the total volume of micropores and mesopores in the porous particle framework is no more than 2 cm$^3$/g, or no more than 1.8 cm$^3$/g, or no more than 1.6 cm$^3$/g, or no more than 1.5 cm$^3$/g, or no more than 1.45 cm$^3$/g, or no more than 1.4 cm$^3$/g, or no more than 1.35 cm$^3$/g, or no more than 1.3 cm$^3$/g, or no more than 1.25 cm$^3$/g, or no more than 1.2 cm$^3$/g, or no more than 1.1, or no more than 1, or no more than 0.95.

Preferably the total volume of micropores and mesopores in the porous particle framework is in the range from 0.45 to 2.2 cm$^3$/g, or from 0.5 to 2 cm$^3$/g, or from 0.55 to 2 cm$^3$/g, or from 0.6 to 1.8 cm$^3$/g, or from 0.65 to 1.8 cm$^3$/g, or from 0.7 to 1.6 cm$^3$/g, or from 0.7 to 1.5 cm$^3$/g, or from 0.7 to 1.4 cm$^3$/g.

The total volume of micropores and mesopores in the porous particle framework may also be in the range from 0.55 to 1.4 cm$^3$/g, or from 0.6 to 1.4 cm$^3$/g, or from 0.6 to 1.3 cm$^3$/g, or from 0.65 to 1.3 cm$^3$/g, or from 0.65 to 1.2 cm$^3$/g, or from 0.7 to 1.2 cm$^3$/g, or from 0.7 to 1.1 cm$^3$/g, or from 0.7 to 1 cm$^3$/g, or from 0.75 to 0.95 cm$^3$/g.

The total volume of micropores and mesopores in the porous particle framework may also be in the range from 0.4 to 0.75 cm$^3$/g, or from 0.4 to 0.7 cm$^3$/g, or from 0.4 to 0.65 cm$^3$/g, 0.45 to 0.75 cm$^3$/g, or from 0.45 to 0.7 cm$^3$/g, or from 0.45 to 0.65 cm$^3$/g, or from 0.45 to 0.6 cm$^3$/g.

The total volume of micropores and mesopores in the porous particle framework may also be in the range from 0.6 to 2 cm$^3$/g, or from 0.6 to 1.8 cm$^3$/g, or from 0.7 to 1.8 cm$^3$/g, or from 0.7 to 1.6 cm$^3$/g, or from 0.8 to 1.6 cm$^3$/g, or from 0.8 to 1.5 cm$^3$/g, or from 0.8 to 1.4 cm$^3$/g, or from 0.9 to 1.5 cm$^3$/g, or from 0.9 to 1.4 cm$^3$/g, or from 1 to 1.4 cm$^3$/g.

The general term "$PD_n$ pore diameter" refers herein to the volume-based nth percentile pore diameter, based on the total volume of micropores and mesopores. For instance, the term "$PD_{50}$ pore diameter" as used herein refers to the pore diameter below which 50% of the total micropore and mesopore volume is found.

The $PD_{50}$ pore diameter of the porous particle framework may be no more than 30 nm, and preferably no more than 25 nm, or no more than 20 nm, or no more than 15 nm, or no more than 12 nm, or no more than 10 nm, or no more than 8 nm, or no more than 6 nm, or no more than 5 nm, or no more than 4 nm, or no more than 3 nm, or no more than 2.5 nm, or no more than 2 nm, or no more than 1.5 nm. The term "$PD_{50}$ pore diameter" as used herein refers to the volume-based median pore diameter, based on the total volume of micropores and mesopores. Therefore, at least 50% of the total volume of micropores and mesopores is preferably in the form of pores having a diameter of less than 30 nm.

The $PD_{30}$ pore diameter of the porous particle framework may be no more than 25 nm, or no more than 20 nm, or no more than 15 nm, or no more than 12 nm, or no more than 10 nm, or no more than 8 nm, or no more than 6 nm, or no more than 5 nm, or no more than 4 nm, or no more than 3 nm, or no more than 2.5 nm, or no more than 2 nm, or no more than 1 nm.

The $PD_{90}$ pore diameter of the porous particle framework may be no more than 35 nm, or no more than 30 nm, or no more than 25 nm, or no more than 20 nm, or no more than 15 nm, or no more than 12 nm, or no more than 10 nm, or no more than 8 nm, or no more than 6 nm, or no more than 5 nm, or no more than 4 nm, or no more than 3 nm, or no more than 2.5 nm, or no more than 2 nm. Preferably, the $PD_{90}$ pore diameter of the porous particle framework is at least 2.5 nm, or at least 3 nm, or at least 3.5 nm, or at least 4 nm. For example, the $PD_{90}$ pore diameter of the porous particle framework is preferably in the range from 2.5 to 20 nm, or from 3 to 15 nm, or from 3.5 to 10 nm, or from 4 to 8 nm.

The $PD_{10}$ pore diameter of the porous particle framework may be no more than no more than 10 nm, or no more than 9 nm, or no more than 8 nm, or no more than 7 nm, or no more than 6 nm, or no more than 5 nm, or no more than 4 nm, or no more than 3 nm, or no more than 2.5 nm, or no more than 2 nm, or no more than 1.5 nm, or no more than 1 nm. Preferably, the $PD_{10}$ pore diameter of the porous particle framework is at least 0.3 nm, or at least 0.4 nm, or at least 0.5 nm. For example, the $PD_{10}$ pore diameter of the porous particle framework is preferably in the range from 0.3 to 10 nm, or from 0.3 to 5 nm, or from 0.3 to 1 nm, or from 0.4 to 1 nm, or from 0.5 to 1 nm.

For the avoidance of doubt, any macropore volume (pore diameter greater than 50 nm) is not taken into account for the purpose of determining $PD_n$ values.

Preferably the volume of micropores in the porous particle framework is at least 0.25 cm$^3$/g, or at least 0.3 cm$^3$/g, at least 0.4 cm$^3$/g, or at least 0.5 cm$^3$/g. Preferably the volume of micropores in the porous particle framework is no more than 1.7 cm$^3$/g, or no more than 1.5 cm$^3$/g, or no more than 1.2 cm$^3$/g. The volume of micropores in the porous particle framework may be in the range from 0.3 to 1.7 cm$^3$/g, or from 0.3 to 1.5 cm$^3$/g, or from 0.3 to 1.2 cm$^3$/g. The volume of micropores in the porous particle framework may be in the range from 0.4 to 1.7 cm$^3$/g, or from 0.5 to 1.7 cm$^3$/g. The volume of micropores in the porous particle framework may be in the range from 0.4 to 1.5 cm$^3$/g, or from 0.5 to 1.2 cm$^3$/g. Having a certain amount of micropore sized voids in the porous particle framework helps to achieve deposition of small sized electroactive material domains within the pores whereas if the micropore volume is too high then infiltration of the porous particle framework by the precursors for the electroactive and modifier domains may be overly restricted.

The volumetric ratio of micropores to mesopores in the porous particle framework may range in principle from 100:0 to 0:100. Preferably, the volumetric ratio of micropores to mesopores is from 90:10 to 30:70, or from 85:15 to 40:60, or from 80:20 to 50:50, or from 70:30 to 55:45.

The total volume of micropores and mesopores and the pore size distribution of micropores and mesopores are determined using nitrogen gas adsorption at 77 K down to a relative pressure $p/p_0$ of $10^{-6}$ using quenched solid density functional theory (QSDFT) in accordance with standard methodology as set out in ISO 15901-2 and ISO 15901-3. Nitrogen gas adsorption is a technique that characterises the porosity and pore diameter distributions of a material by allowing a gas to condense in the pores of a solid. As pressure increases, the gas condenses first in the pores of smallest diameter and the pressure is increased until a saturation point is reached at which all of the pores are filled with liquid. The nitrogen gas pressure is then reduced incrementally, to allow the liquid to evaporate from the system. Analysis of the adsorption and desorption isotherms, and the hysteresis between them, allows the pore volume and pore size distribution to be determined. Suitable instruments for the measurement of pore volume and pore size distributions by nitrogen gas adsorption include the TriStar II and TriStar II Plus porosity analyzers, which are available from Micromeritics Instrument Corporation, USA, and the Autosorb IQ porosity analyzers, which are available from Quantachrome Instruments.

Nitrogen gas adsorption is effective for the measurement of pore volume and pore size distributions for pores having a diameter up to 50 nm, but is less reliable for pores of much larger diameter. For the purposes of the present invention, nitrogen adsorption is therefore used to determine pore volumes and pore size distributions only for pores having a diameter up to and including 50 nm (i.e. only for micropores and mesopores). $PD_{50}$ values are likewise determined relative to the total volume of micropores and mesopores only.

In view of the limitations of available analytical techniques it is not possible to measure pore volumes and pore size distributions across the entire range of micropores, mesopores and macropores using a single technique. In the case that the porous particles or porous particle framework comprise macropores, the volume of pores having diameter in the range from greater than 50 nm and up to 100 nm may be measured by mercury porosimetry and is preferably no more than 0.3 cm$^3$/g, or no more than 0.2 cm$^3$/g, or no more than 0.1 cm$^3$/g, or no more than 0.05 cm$^3$/g. A small fraction of macropores may be useful to facilitate electrolyte access into the pore network, but the advantages of the invention are obtained substantially by accommodating silicon in micropores and smaller mesopores.

Any pore volume measured by mercury porosimetry at pore sizes of 50 nm or below is disregarded (as set out above, nitrogen adsorption is used to characterize the mesopores and micropores). Pore volume measured by mercury porosimetry above 100 nm is assumed for the purposes of the invention to be inter-particle porosity and is also disregarded.

Mercury porosimetry is a technique that characterizes the porosity and pore diameter distributions of a material by applying varying levels of pressure to a sample of the material immersed in mercury. The pressure required to intrude mercury into the pores of the sample is inversely proportional to the size of the pores. Values obtained by mercury porosimetry as reported herein are obtained in accordance with ASTM UOP578-11, with the surface tension γ taken to be 480 mN/m and the contact angle φ taken to be 140° for mercury at room temperature. The density of mercury is taken to be 13.5462 g/cm$^3$ at room temperature. A number of high precision mercury porosimetry instruments are commercially available, such as the AutoPore IV series of automated mercury porosimeters available from Micromeritics Instrument Corporation, USA. For a complete review of mercury porosimetry reference may be made to P. A. Webb and C. Orr in "Analytical Methods in Fine Particle Technology, 1997, Micromeritics Instrument Corporation, ISBN 0-9656783-0.

It will be appreciated that intrusion techniques such as gas adsorption and mercury porosimetry are effective only to determine the pore volume of pores that are accessible to nitrogen or to mercury from the exterior of the porous particles. Porosity values specified herein shall be understood as referring to the volume of open pores, i.e. pores that are accessible to a fluid from the exterior of the porous particles. Fully enclosed pores which cannot be identified by nitrogen adsorption or mercury porosimetry shall not be taken into account herein when determining porosity values. Likewise, any pore volume located in pores that are so small as to be below the limit of detection by nitrogen adsorption is not taken into account.

The pore size distribution of the porous particle framework may be monomodal, bimodal or multimodal. As used herein, the term "pore size distribution" relates to the distribution of pore size relative to the cumulative total internal pore volume of the porous particle framework. A bimodal or multimodal pore size distribution may be preferred since close proximity between micropores and pores of larger diameter provides the advantage of efficient ionic transport through the porous network to the silicon.

The porous particle framework preferably has a BET surface area of at least 100 m$^2$/g, or at least 500 m$^2$/g, or at least 750 m2/g, or at least 1,000 m$^2$/g, or at least 1,250 m2/g, or at least 1,500 m$^2$/g. The term "BET surface area" as used herein should be taken to refer to the surface area per unit mass calculated from a measurement of the physical adsorption of gas molecules on a solid surface, using the Brunauer-Emmett-Teller theory, in accordance with ISO 9277. Preferably, the BET surface area of the porous particle framework is no more than 4,000 m$^2$/g, or no more than 3,500 m$^2$/g, or no more than 3,250 m2/g, or no more than 3,000 m$^2$/g or no more than 2,500 m$^2$/g, or no more than 2,000 m$^2$/g. For example, the porous particle framework may have a BET surface area in the range from 100 m$^2$/g to 4,000 m$^2$/g, or from 500 m$^2$/g to 4,000 m$^2$/g, or from 750 m2/g to 3,500 m$^2$/g, or from 1,000 m$^2$/g to 3,250 m2/g, 1,000 m$^2$/g to 3,000 m$^2$/g or from 1,000 m$^2$/g to 2,500 m$^2$/g, or from 1,000 m$^2$/g to 2,000 m$^2$/g.

The porous particle framework is preferably conductive. A conductive porous particle framework comprises or consists of a conductive carbon material. A conductive porous carbon particle framework preferably comprises at least 80 wt % carbon, more preferably at least 90 wt % carbon, more preferably at least 95 wt % carbon, and optionally at least 98 wt % or at least 99 wt % carbon. The carbon may be crystalline carbon or amorphous carbon, or a mixture of amorphous and crystalline carbon. The carbon may be either carbon or soft carbon.

As used herein, the term "hard carbon" refers to a disordered carbon matrix in which carbon atoms are found predominantly in the sp$^2$ hybridised state (trigonal bonds) in nanoscale polyaromatic domains. The polyaromatic domains are cross-linked with a chemical bond, e.g. a C—O—C bond. Due to the chemical cross-linking between the polyaromatic domains, hard carbons cannot be converted to graphite at high temperatures. Hard carbons have graphite-like character as evidenced by the large G-band (~1600 cm$^{-1}$) in the Raman spectrum. However, the carbon is not fully graphitic as evidenced by the significant D-band (~1350 cm$^{-1}$) in the Raman spectrum.

As used herein, the term "soft carbon" also refers to a disordered carbon matrix in which carbon atoms are found predominantly in the sp$^2$ hybridised state (trigonal bonds) in polyaromatic domains having dimensions in the range from 5 to 200 nm. In contrast to hard carbons, the polyaromatic domains in soft carbons are associated by intermolecular forces but are not cross-linked with a chemical bond. This means that they will graphitise at high temperature. The porous carbon framework preferably comprises at least 50% sp$^2$ hybridised carbon as measured by XPS. For example, the porous carbon framework may suitably comprise from 50% to 98% sp$^2$ hybridised carbon, from 55% to 95% sp$^2$ hybridised carbon, from 60% to 90% sp$^2$ hybridised carbon, or from 70% to 85% sp$^2$ hybridised carbon.

A variety of different materials may be used to prepare porous particles that are suitable to form the porous particle framework via pyrolysis methods. Examples of organic materials that may be used include plant biomass including lignocellulosic materials (such as coconut shells, rice husks, wood etc.) and fossil carbon sources such as coal. Examples of resins and polymeric materials which form porous carbon particles on pyrolysis include phenolic resins, novolac resins, pitch, melamines, polyacrylates, polystyrenes, polyvinylalcohol (PVA), polyvinylpyrrolidone (PVP), and various copolymers comprising monomer units of acrylates, styrenes, α-olefins, vinyl pyrrolidone and other ethylenically unsaturated monomers. A variety of different carbon materials are available in the art depending on the starting material and the conditions of the pyrolysis process. Porous carbon particles of various different specifications are available from commercial suppliers.

The porous carbon particles may undergo a chemical or gaseous activation process to increase the volume of mesopores and micropores. A suitable activation process comprises contacting pyrolyzed carbon with one or more of oxygen, steam, CO, CO$_2$ and KOH at a temperature in the range from 600 to 1000° C.

Mesopores can also be obtained by known templating processes, using extractable pore formers such as MgO and other colloidal or polymer templates which can be removed by thermal or chemical means post pyrolysis or activation.

Alternatives to carbon-based particle frameworks include porous particle frameworks comprising titanium nitride (TiN), titanium carbide (TiC), silicon carbide (SIC), nickel oxide (NiOx), titanium silicon nitride (TiSiN), nickel nitride (Ni$_3$N), molybdenum nitride (MoN), titanium oxynitride (TiO$_x$N$_{1-x}$), silicon oxycarbide (SiOC), boron nitride (BN), or vanadium nitride (VN). Preferably the porous particle framework comprises titanium nitride (TiN), silicon oxycarbide (SiOC) or boron nitride (BN). Further alternatives to carbon-based particle frameworks include porous particle frameworks comprising metal oxides, such as oxides of titanium having the formula TiO$_x$ where x has a value greater than 1 and less than 2.

The porous particle framework may be irregular or spheroidal in shape.

The plurality of electroactive material domains may each comprise the same electroactive material or different electroactive material domains may comprise different electroactive materials. Preferably, the electroactive material domains comprise an electroactive material selected from elemental silicon, elemental tin, elemental germanium, elemental aluminium, and mixtures and alloys thereof. For example, some electroactive material domains may comprise (or consist of) elemental silicon, while other electroactive material domains may comprise (or consist of) elemental germanium. A preferred electroactive material is silicon. Preferably, at least a portion of the electroactive material domains comprise or consist of elemental silicon. More preferably, all of the electroactive material domains comprise or consist of elemental silicon.

As used herein, "modifier material domain" refers to a domain of material having a distinct chemical composition from the electroactive material domains. At least a portion of the modifier material domains are located between adjacent electroactive material domains. The requirement that "at least a portion of the modifier material domains are located between adjacent electroactive material domains" shall be interpreted to mean that the pore spaces of the porous particle framework are occupied sequentially by electroactive material domains then modifier material domains, then further electroactive material domains. Thus, the electroactive material does not form an extended network throughout the pore space but is interrupted by the modifier material domains. Thus, within a single pore space there is an assembly of material domains that follows the sequence according to FIG. 1.

This sequence of materials is generally obtained by sequentially depositing electroactive materials and modifier materials into the pores of the porous particle framework as discussed in further detail below. This sequence may be extended by additional electroactive material domains and/or by additional modifier material domains as appropriate.

The modifier material domains located between adjacent electroactive material domains may act as barriers that separate the electroactive material domains, limiting the length scale of continuous electroactive material domains within the composite particles. The modifier material domains located between adjacent electroactive material domains may act as barriers that separate the electroactive material domains. The modifier material domains located between adjacent electroactive material domains may function to limit the length scale of continuous electroactive material domains within the composite particles.

The electroactive material domains and modifier material domains may be discrete domains, with a sharp boundary between the two, or there may be a composition gradient between the electroactive material domains and the modifier material domains. The modifier material domains may be coatings (such as films) on the surfaces of at least some or all of the electroactive material domains. Modifier material domains may be chemically bonded (e.g. covalently, ionically or metallically bonded) to electroactive material domains. For example, the modifier material domains may comprise a passivation layer at the surface of the electroactive material domains, or an alloy of the electroactive material at the surface of the electroactive material domains, or a doped electroactive material at the surface of the electroactive material domains. Alternatively, modifier material domains may not be chemically bonded to electroactive material domains. For example, the modifier materials may comprise or consist of a solid-state electrolyte or an inert filler.

The modifier material domains may comprise one or more of carbon, nitrogen and/or oxygen. The modifier material domain may be a passivation layer.

The modifier material domain may be an oxide passivation layer. One type of modifier material is a native oxide passivation layer that is formed, for example, by exposing the surface of the electroactive material domains to air or another oxygen containing gas. In the case that the electroactive material domains comprise silicon, the modifier material domains may comprise a silicon oxide of the formula SiO$_x$, wherein $0<x\leq2$. The silicon oxide is preferably amorphous silicon oxide.

The modifier material domain may be a nitride passivation layer. Another type of modifier material is a nitride passivation layer that is formed, for example, by exposing the surface of the electroactive material domains to ammonia or another nitrogen containing molecule. In the case that the electroactive material domains comprise silicon, the modifier material domains may comprise a silicon nitride of the formula SiN$_x$, wherein $0<x\leq4/3$. The silicon nitride is preferably amorphous silicon nitride. Nitride modifier materials are preferred to oxide modifier materials. As substoichiometric nitrides (such as SiN$_x$, wherein $0<x\leq4/3$) are conductive, nitride modifier domains function as a conductive network that allows for faster charging and discharge of the electroactive material. Nitride modifier material domains are also thought to improve capacity retention. Phosphine may also be used as a passivating agent, as a phosphorus analog of ammonia.

The modifier material domain may be an oxynitride passivation layer. Another type of modifier material is an oxynitride passivation layer that is formed, for example, by exposing the surface of the electroactive material domains to ammonia (or another nitrogen containing molecule) and oxygen gas. In the case that the electroactive material domains comprise silicon, the modifier material domains may comprise a silicon oxynitride of the formula SiO$_x$N$_y$, wherein $0<x<2$, $0<y<4/3$, and $0<(2x+3y)\leq4$). The silicon nitride is preferably amorphous silicon oxynitride.

The modifier material domain may be a carbide passivation layer. Another type of modifier material is a carbide passivation layer. In the case that the electroactive material domains comprise silicon, the modifier material domains may comprise a silicon carbide of the formula SiC$_x$, wherein $0<x\leq1$. The silicon carbide is preferably amorphous silicon carbide. A silicon carbide layer may be formed by contacting the surface of the electroactive material domains with carbon containing precursors, e.g. methane or ethylene at elevated temperatures.

Another type of modifier material is a passivation layer comprising an organic moiety covalently bonded to the surface of at least a portion of the electroactive material domains. For example, the modifier material domains may comprise a carbon-containing organic moiety covalently bonded to the surface of the electroactive material domains. For example, the modifier material domains may comprise a hydrocarbyl covalently bonded to the surface of the electroactive material domains.

Suitable passivating agents for forming a passivation layer comprising an organic moiety include compounds comprising an alkene, alkyne or carbonyl functional group, more preferably a terminal alkene, terminal alkyne, aldehyde or ketone group.

A covalently bonded organic modifier material domain may be formed by insertion of organic compounds into an M-H group at the surface of the electroactive material (where M represents an atom of the electroactive material) to form a covalently passivated surface which is resistant to oxidation by air. When silicon is the electroactive material, the passivation reaction between the silicon surface and the passivating agent may be understood as a form of hydrosilylation, as shown schematically below.

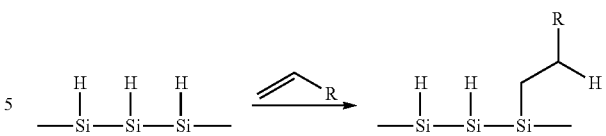

Replacing hydride terminations at the surface of the electroactive material domains with covalently bonded organic modifier material domains such as a carbon-containing organic moiety is advantageous because hydride terminations can decompose to produce hydrogen gas which can be detrimental to topography of electrodes. Further, Si—C bonding is thought to improve conductivity.

Suitable organic compounds that may be used to form the modifier material domains via passivation of the surface of the electroactive material domains include compounds comprising an alkene, alkyne or carbonyl functional group, more preferably a terminal alkene, terminal alkyne or aldehyde group. For example, the modifier material domains may be formed by passivation of the surface of the electroactive material domains with one or more compounds of the formulae:

Preferred passivating agents include one or more compounds of the formulae:

 (i)

 (ii)

 (iii)

wherein each R$^1$ independently represents H or an unsubstituted or substituted aliphatic or aromatic hydrocarbyl group having from 1 to 20 carbon atoms, or wherein two R$^1$ groups form an unsubstituted or substituted ring structure comprising from 3 to 8 carbon atoms in the ring.

The modifier material may be a hydrocarbyl covalently bonded to the surface of at least a portion of the electroactive material domains. The modifier material may be a C$_{2-22}$ hydrocarbyl covalently bonded to the surface of at least a portion of the electroactive material domains. The modifier material may be a saturated or unsaturated C$_{2-22}$ hydrocarbyl covalently bonded to the surface of at least a portion of the electroactive material domains. The modifier material may be a linear or branched C$_{2-22}$ hydrocarbyl covalently bonded to the surface of at least a portion of the electroactive material domains. The modifier material may be a monocyclic or polycyclic C$_{2-22}$ hydrocarbyl covalently bonded to the surface of at least a portion of the electroactive material domains. The modifier material may be a C$_{2-22}$ alkyl, C$_{2-22}$ alkenyl, C$_{2-22}$ alkynyl, C$_{3-22}$ cycloalkyl, C$_{3-22}$ cycloalkenyl C$_{3-22}$ cycloalkynyl or C$_{6-22}$ aralkyl covalently bonded to the surface of at least a portion of the electroactive material domains. The modifier material may be selected from the group consisting of:

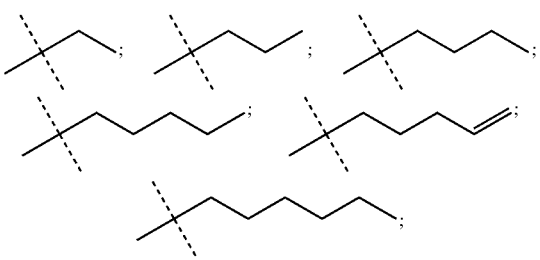

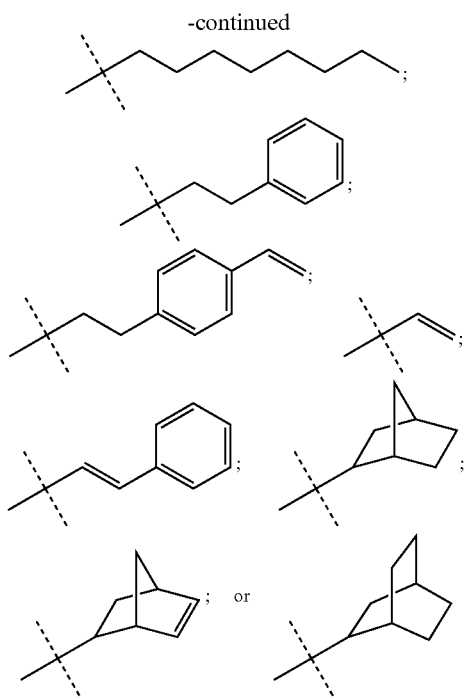

covalently bonded to the surface of at least a portion of the electroactive material domains. It will be understood that the bond shown with a dashed line struck through is to an atom on the surface of the electroactive material domain. For example when the electroactive material is silicon, the bond shown with a dashed line struck through is to Si.

Particularly preferred passivating agents include one or more compounds of the formulae:

CH$_2$=CH—R$^1$; and  (i)

HC≡C—R$^1$;  (ii)

wherein R$^1$ is as defined above. Preferably, R$^1$ is unsubstituted.

Particular examples of suitable organic compounds that may be used to form the modifier material domains via passivation of the surface of the electroactive material domains include ethylene, propylene, 1-butene, butadiene, 1-pentene, 1,4-pentadiene, 1-hexene, 1-octene, styrene, divinylbenzene, acetylene, phenylacetylene, norbornene, norbornadiene and bicyclo[2.2.2]oct-2-ene. Mixtures of different passivating agents may also be used.

Further examples of organic compounds that may be used to form the modifier material domains via passivation of the surface of the electroactive material domains include compounds including an active hydrogen atom bonded to oxygen, nitrogen, sulphur or phosphorus. For example, the passivating agent may be an alcohol, amine, thiol or phosphine. Reaction of the group —XH with hydride groups at the surface of the electroactive material is understood to result in elimination of H$_2$ and the formation of a direct bond between X and the electroactive material surface.

Suitable passivating agents in this category include compounds of the formula

HX—R$^2$, and  (iv)

HX—C(O)—R$^1$,  (v)

wherein X represents O, S, NR$^1$ or PR$^1$; each R$^1$ is independently as defined above; and R$^2$ represents an unsubstituted or substituted aliphatic or aromatic hydrocarbyl group having from 1 to 20 carbon atoms, or R$^1$ and R$^2$ together form an unsubstituted or substituted ring structure comprising from 3 to 8 carbon atoms in the ring.

Preferably X represents O or NH. Particularly preferably, X represents NH.

Preferably R$^2$ represents an optionally substituted aliphatic or aromatic group having from 2 to 10 carbon atoms. Amine groups may also be incorporated into a 4-10 membered aliphatic or aromatic ring structure, as in pyrrolidine, pyrrole, imidazole, piperazine, indole, or purine.

As a further alternative, the modifier material domains may comprise a pyrolytic carbon material. Pyrolytic carbon domains may be formed by CVI using a suitable carbon-containing precursor, as discussed in further detail below. The use of a pyrolytic carbon material is advantageous in significantly reducing the surface area of the composite particles, which is thought to improve cycle life and maintain capacity.

As a further alternative, the modifier material domains may be a conductive metal or metal alloy. Conductive metal or metal alloy domains may be formed by CVI using a suitable metal-containing precursor, as discussed in further detail below. Examples of suitable conductive metals include silver, gold, copper and titanium.

As a further alternative, the modifier material domains may comprise an electroactive material comprising a dopant selected from the group consisting of boron, aluminium, gallium, indium, phosphorus, arsenic, antimony and bismuth. The dopant is preferably boron or phosphorus. The electroactive material may be the same electroactive material in the electroactive material domains or it may be different. The electroactive material may be selected from the group consisting of elemental silicon, elemental tin, elemental germanium, elemental aluminium, and mixtures and alloys thereof. A preferred electroactive material is silicon.

As a further alternative, the modifier material domains may comprise or consist of a solid-state electrolyte. The solid-state electrolyte may be an organic solid electrolyte or an inorganic solid electrolyte.

Examples of organic solid electrolytes include polyethylene derivatives polyethyleneoxide derivatives, polypropylene oxide derivatives, phosphoric acid ester polymers, polyester sulfide, polyvinylalcohols, polyvinylidine fluoride and polymers containing ionic dissociation groups.

Examples of inorganic solid electrolytes include nitrides, halides and sulfides of lithium salts such as Li$_5$NI$_2$, Li$_3$N, Lil, LiSiO$_4$, Li$_2$SiS$_3$, Li$_4$SiO$_4$, LiOH and Li$_3$PO$_4$.

As a further alternative, the modifier material domains may comprise or consist of an inert filler.

It is preferred that the modifier material does not comprise oxygen. The use of a modifier material that does not comprise oxygen is thought to contribute to providing composite particles with low total oxygen content, which is thought to reduce first cycle loss, improve electronic conductivity, improve cycle life and maintain capacity. Examples of modifier materials that do not comprise oxygen include a nitride passivation layer, a carbide passivation layer, a hydrocarbyl covalently bonded to the surface of the electroactive material domains, a pyrolytic carbon material, a conductive metal or metal alloy, an electroactive material comprising a dopant, a solid-state electrolyte, and an inert filler.

In a preferred embodiment, the modifier material is a hydrocarbyl (such as a C$_{2-22}$ hydrocarbyl) covalently bonded to the surface of at least a portion of the electroactive material domains, or a nitride passivation layer as described herein. These modifier materials are thought to provide a lower total oxygen content, improved conductivity and reduce the chemical reactivity of the electroactive material domains.

The composite particles may optionally further comprise outer modifier material domains located between the outermost electroactive material domains and the exterior of the composite particles. These modifier material domains form a barrier between the electroactive material and the exterior of the composite particles, thereby inhibiting electrolyte contact with the outermost electroactive material domains that would otherwise be liable to SEI formation. The outer modifier material domains may be formed from any of the modifier materials described herein. A preferred modifier material for the outer modifier material domains is a pyrolytic carbon material. Another preferred modifier material for the outer modifier material domains is a native oxide of the electroactive material.

In a preferred embodiment, the particulate material of the invention comprises a plurality of elemental silicon domains (as electroactive domains) and a plurality of modifier material domains disposed within the internal pore volume of the porous particle framework, wherein said modifier material domains comprise a passivation layer comprising an organic moiety located between adjacent elemental silicon domains and covalently bonded to the surface of at least a portion of the elemental silicon domains. The composite particles may further comprise outer modifier material domains that are silicon oxide domains.

In a further preferred embodiment, the particulate material of the invention comprises a plurality of elemental silicon domains (as electroactive domains) and a plurality of pyrolytic carbon domains disposed within the internal pore volume of the porous particle framework, wherein at least a portion of said pyrolytic carbon domains are located between adjacent elemental silicon domains. The composite particles may further comprise outer modifier material domains that are silicon oxide domains.

In a further preferred embodiment, the particulate material of the invention comprises a plurality of elemental silicon domains (as electroactive domains) and a plurality of metal or metal alloy domains disposed within the internal pore volume of the porous particle framework, wherein at least a portion of said metal or metal alloy domains are located between adjacent elemental silicon domains. The composite particles may further comprise outer modifier material domains that silicon oxide domains.

A range of different electroactive material loadings in the composite particles may be used with the invention. For example, the amount of electroactive material in the composite particles may be in the range of from 5 to 85 wt % based on the total mass of the composite particles. Preferably, the amount of electroactive material in the composite particles is from 10 to 85 wt %, or from 15 to 85 wt %, or from 20 to 80 wt %, or from 25 to 80 wt %, or from 30 to 75 wt %, or from 35 to 75 wt %, or from 40 to 70 wt %, or from 45 to 65 wt % based on the total mass of the composite particles.

The composite particles may comprise from 40 to 70 wt %, or from 45 to 70 wt %, or from 48 to 70 wt %, or from 50 to 70 wt %, or from 40 to 65 wt %, or from 45 to 65 wt %, or from 48 to 65 wt %, or from 50 to 65 wt %, or from 40 to 60 wt %, or from 45 to 60 wt %, or from 48 to 60 wt %, or from 50 to 60 wt % of the electroactive material based on the total mass of the composite particles.

Preferably, the composite particles comprise from 10 to 85 wt %, or from 15 to 85 wt %, or from 20 to 80 wt %, or from 25 to 80 wt %, or from 30 to 75 wt %, or from 35 to 75 wt %, or from 40 to 70 wt %, or from 45 to 65 wt % silicon based on the total mass of the composite particles.

The composite particles may comprise from 40 to 70 wt %, or from 45 to 70 wt %, or from 48 to 70 wt %, or from 50 to 70 wt %, or from 40 to 65 wt %, or from 45 to 65 wt %, or from 48 to 65 wt %, or from 50 to 65 wt %, or from 40 to 60 wt %, or from 45 to 60 wt %, or from 48 to 60 wt %, or from 50 to 60 wt % of silicon based on the total mass of the composite particles.

The amount of electroactive material (e.g. silicon) in the composite particles may be selected such that at least 25% and as much as 90% or more of the internal pore volume of the porous particle framework is occupied by electroactive material. For example, the electroactive material (e.g. silicon) may occupy from 25% to 80%, or from 25% to 60%, or from 25% to 55%, or from 30% to 50%, or from 53 to 55%, or from 40 to 60%, or from 25% to 45%, or from 25% to 40% of the internal pore volume of the porous particle framework. Within these preferred ranges, the pore volume of the porous particle framework is effective to accommodate expansion of the electroactive material (e.g. silicon) during charging and discharging, but avoids excess pore volume which does not contribute to the volumetric capacity of the particulate particles. However, the amount of electroactive material is also not so high as to impede effective lithiation due to inadequate metal-ion diffusion rates or due to inadequate expansion volume resulting in mechanical resistance to lithiation.

In the case that the electroactive material is silicon, the amount of silicon in the composite particles can be related to the available pore volume by the requirement that the mass ratio of silicon to the porous particle framework is in the range from $[0.5 \times P^1$ to $1.9 \times P^1]$: 1, wherein $P^1$ is a dimensionless quantity having the magnitude of the total pore volume of micropores and mesopores of the porous particle framework, as expressed in $cm^3/g$ (e.g. if the porous particles or porous particle framework have a total volume of micropores and mesopores of 1.2 $cm^3/g$, then $P^1=1.2$). This relationship takes into account the density of silicon and the pore volume of the porous particle framework to define a weight ratio of silicon at which the pore volume is around 20% to 82% occupied.

The amount of electroactive material (e.g. silicon) in the composite particles can be determined by elemental analysis. Elemental analysis may be used to determine the composition of the porous particles that form the porous particle framework alone, and the composition of the electroactive material-containing composite particles. For example, determining the weight percentage of carbon in porous carbon particles alone takes account of the possibility that the porous carbon particles contain a minor amount of heteroatoms. Both measurements taken together allow the weight percentage of electroactive material (e.g. silicon) relative to the porous carbon particles to be determined reliably.

Silicon content is preferably determined by ICP-OES (Inductively coupled plasma-optical emission spectrometry). A number of ICP-OES instruments are commercially available, such as the iCAP® 7000 series of ICP-OES analysers available from ThermoFisher Scientific. The carbon content of the composite particles and of the porous carbon particles alone (as well as the hydrogen, nitrogen and oxygen content if required) are preferably determined by IR absorption. A suitable instrument for determining carbon, hydrogen, nitrogen and oxygen content is the TruSpec® Micro elemental analyser available from Leco Corporation.

At least 85 wt % of the electroactive material mass in the composite particles may be located within the internal pore volume of the porous particle framework. Preferably at least 90 wt %, more preferably at least 95 wt %, even more preferably at least 98 wt % of the electroactive material (e.g. silicon) mass in the composite particles is located within the internal pore volume of the porous particle framework such that there is no or very little electroactive material (e.g. silicon) located on the external surfaces of the composite particles. The reaction kinetics of the CVI process ensure that preferential deposition of electroactive material (e.g. silicon) occurs on internal surfaces of the porous particles.

The composite particles preferably have a low total oxygen content. Oxygen may be present in the composite particles for instance as part of the porous particle framework or as an oxide layer on any exposed silicon surfaces. Preferably, the total oxygen content of the composite particles is less than 15 wt %, more preferably less than 10 wt %, more preferably less than 5 wt %, for example less than 4 wt %, or less than 3 wt %, or less than 2 wt %, or less than 1 wt %, or less than 0.5 wt % based on the total mass of the composite particles. Preferably, the total oxygen content of the composite particles is less than 5 wt %, or less than 4 wt %, or less than 3 wt %, or less than 2 wt %, or less than 1 wt %, or less than 0.5 wt % based on the total mass of the composite particles.

The composite particles may comprise a ratio of total oxygen content to silicon content based on the total mass of the composite particles of 0.1:1 or less.

The composite particles preferably have a low total chlorine content. Chlorine may be present in the composite particles for instance as part of a by-product of the electroactive material deposition. Preferably, the total chlorine content of the composite particles is less than 100 ppm, or less than 90 ppm, or less than 80 ppm, or less than 70 ppm based on the total mass of the composite particles. Without being bound by theory, it is thought that chlorine is an impurity in the composite particles that is deleterious to cell performance.

The composite particles preferably have a low total content of transition metals and/or alkali metals. For example, the total content of transition metals and alkali metals in the composite particles may be less than 0.5 wt % based on the total weight of the composite particle.

Optionally, the composite particles comprise from 0.0001 to 0.5 wt %, for example from 0.001 to 0.1 wt %, of zirconium based on the total mass of the composite particles.

The composite particles preferably have a $D_{50}$ particle diameter in the range of 0.5 to 30 µm. Where the $D_{50}$ particle diameter of the composite particles at the end of the CVI process is more than 30 µm, the composite particles are preferably reduced in size, e.g. by milling, prior to their use in manufacturing electrodes to a $D_{50}$ particle diameter of no more than 30 µm. Composite particles with a $D_{50}$ particle diameter that is no more than 30 µm have good dispersibility in slurries, structural robustness, high capacity retention over repeated charge-discharge cycles, and are suitable for forming dense electrode layers of uniform thickness in the conventional thickness range from 20 to 50 µm.

Optionally, the $D_{50}$ particle diameter of the composite particles may be at least 1 µm, or at least 2 µm, or at least 3 µm, or at least 4 µm, or at least 5 µm. Optionally the $D_{50}$ particle diameter may be no more than 20 µm, or no more than 18 µm, or no more than 16 µm, or no more than 14 µm, or no more than 12 µm, or no more than 10 µm, or no more than 8 µm.

For instance, the composite particles may have a $D_{50}$ particle diameter in the range from 1 to 25 µm, or from 1 to 20 µm, or from 1 to 18 µm, or from 1 to 16 µm, or from 2 to 16 µm, or from 2 to 14 µm, or from 2 to 12 µm, or from 2 to 10 µm, or from 2 to 8 µm.

The $D_{10}$ particle diameter of the composite particles is preferably at least 0.5 µm, or at least 0.8 µm, or at least 1 µm. By maintaining the $D_{10}$ particle diameter at 0.5 µm or more, the potential for undesirable agglomeration of sub-micron sized particles is reduced, resulting in improved dispersibility of the particulate material and improved capacity retention.

The $D_0$ particle diameter of the composite particles is preferably no more than 50 µm, or no more than 40 µm, or no more than 30 µm, or no more than 25 µm, or no more than 20 µm, or no more than 15 µm. The presence of very large particles results in non-uniform forming packing of the particles in electrode active layers, thus disrupting the formation of dense electrode layers, particularly electrode layers having a thickness in the range from 20 to 50 µm. Therefore, it is preferred that the $D_{90}$ particle diameter is up to 40 µm, and more preferably lower still.

The composite particles preferably have a narrow size distribution span. For instance, the particle size distribution span (defined as $(D_{90}-D_{10})/D_{50}$) is preferably 5 or less, more preferably 4 or less, more preferably 3 or less, more preferably 2 or less, and most preferably 1.5 or less. By maintaining a narrow size distribution span, efficient packing of the particles into dense electrode layers is more readily achievable.

For the avoidance of doubt, the term "particle diameter" as used herein refers to the equivalent spherical diameter (esd), i.e. the diameter of a sphere having the same volume as a given particle, wherein the particle volume is understood to include the volume of any intra-particle pores. The terms "$D_{50}$" and "$D_{50}$ particle diameter" as used herein refer to the volume-based median particle diameter, i.e. the diameter below which 50% by volume of the particle population is found. The terms "$D_{10}$" and "$D_{10}$ particle diameter" as used herein refer to the 10th percentile volume-based median particle diameter, i.e. the diameter below which 10% by volume of the particle population is found. The terms "$D_{90}$" and "$D_{90}$ particle diameter" as used herein refer to the 90th percentile volume-based median particle diameter, i.e. the diameter below which 90% by volume of the particle population is found.

Particle diameters and particle size distributions can be determined by standard laser diffraction techniques in accordance with ISO 13320:2009. Laser diffraction relies on the principle that a particle will scatter light at an angle that varies depending on the size the particle and a collection of particles will produce a pattern of scattered light defined by intensity and angle that can be correlated to a particle size distribution. A number of laser diffraction instruments are commercially available for the rapid and reliable determination of particle size distributions. Unless stated otherwise, particle size distribution measurements as specified or reported herein are as measured by the conventional Malvern Mastersizer™ 3000 particle size analyzer from Malvern Instruments™. The Malvern Mastersizer™ 3000 particle size analyzer operates by projecting a helium-neon gas laser beam through a transparent cell containing the particles of interest suspended in an aqueous solution. Light rays which strike the particles are scattered through angles which are inversely proportional to the particle size and a photodetector array measures the intensity of light at several predetermined angles and the measured intensities at different angles are processed by a computer using standard theoretical principles to determine the particle size distribution. Laser diffraction values as reported herein are obtained using a wet dispersion of the particles in 2-propanol with a 5 vol % addition of the surfactant SPAN™-40 (sorbitan monopalmitate). The particle refractive index is taken to be 2.68 for porous particles and 3.50 for composite particles and the dispersant index is taken to be 1.378. Particle size distributions are calculated using the Mie scattering model.

The composite particles preferably have a total volume of micropores and/or mesopores, measured by nitrogen gas adsorption as described herein, that is no more than 0.35 cm$^3$/g, or no more than 0.25 cm$^3$/g, or no more than 0.15 cm$^3$/g, or no more than 0.1 cm$^3$/g, or no more than 0.05 cm$^3$/g, or no more than 0.03 cm$^3$/g, or no more than 0.02 cm$^3$/g. Preferably the total volume of micropores and/or mesopores of the composite particles is no more than 20 vol % of the total volume of micropores and/or mesopores of the porous particle framework, more preferably no more than 15 vol %, or no more than 10 vol %, or no more than 5 vol %. A lower total volume of micropores and/or mesopores in the composite particles reduces infiltration of the composite particles by electrolyte solvents causing the formation of SEI internally, and reduces the surface area generally, providing better control on avoiding undesirable surface reactions in use.

The composite particles preferably have a BET surface area of no more than 300 m$^2$/g, or no more than 250 m$^2$/g, or no more than 200 m$^2$/g, or no more than 150 m$^2$/g. More preferably, no more than 100 m$^2$/g, or no more than 80 m$^2$/g, or no more than 60 m$^2$/g, or no more than 50 m$^2$/g, or no more than 40 m$^2$/g, or no more than 30 m$^2$/g, or no more than 25 m$^2$/g, or no more than 20 m$^2$/g, or no more than 15 m$^2$/g, or no more than 10 m$^2$/g, or no more than 5 m$^2$/g. Preferably the composite particles have a BET surface area of no more than 30 m$^2$/g, or no more than 25 m$^2$/g, or no more than 20 m$^2$/g, or no more than 15 m$^2$/g, or no more than 10 m$^2$/g, or no more than 5 m$^2$/g. In general, a low BET surface area is preferred in order to minimize the formation of solid electrolyte interphase (SEI) layers at the surface of the composite particles during the first charge-discharge cycle of an anode. However, a BET surface area which is excessively low results in unacceptably low charging rate and capacity due to the inaccessibility of the bulk of the electroactive material to metal ions in the surrounding electrolyte. For instance, the BET surface area may be in the range from 0.1 to 100 m$^2$/g, or from 0.1 to 80 m$^2$/g, or from 0.5 to 60 m$^2$/g, or from 0.5 to 40 m$^2$/g, or from 1 to 30 m$^2$/g, or from 1 to 25 m$^2$/g, or from 2 to 20 m$^2$/g.

The composite particles may be irregular or spheroidal in shape. Spheroidal particles as defined herein may include both spherical and ellipsoidal particles and the shape of the composite particles of the invention may suitably be defined by reference to the sphericity and the aspect ratio of the particles of the invention. Spheroidal particles are found to be particularly well-suited to dispersion in slurries without the formation of agglomerates. In addition, the use of porous spheroidal particles is surprisingly found to provide a further improvement in strength when compared to porous particles and porous particle fragments of irregular morphology.

The sphericity of an object is conventionally defined as the ratio of the surface area of a sphere to the surface area of the object, wherein the object and the sphere have identical volume. However, in practice it is difficult to measure the surface area and volume of individual particles at the micron scale. However, it is possible to obtain highly accurate two-dimensional projections of micron scale particles by scanning electron microscopy (SEM) and by dynamic image analysis, in which a digital camera is used to record the shadow projected by a particle. The term "sphericity" as used herein shall be understood as the ratio of the area of the particle projection to the area of a circle, wherein the particle projection and circle have identical circumference. Thus, for an individual particle, the sphericity S may be defined as:

$$S = \frac{4 \cdot \pi \cdot A_m}{(C_m)^2}$$

wherein $A_m$ is the measured area of the particle projection and $C_m$ is the measured circumference of the particle projection. The average sphericity $S_{av}$ of a population of particles as used herein is defined as:

$$S_{av} = \frac{1}{n}\sum_{i=1}^{n}\left[\frac{4 \cdot \pi \cdot A_m}{(C_m)^2}\right]$$

wherein n represents the number of particles in the population.

As used herein, the term "spheroidal" as applied to the composite particles of the invention shall be understood to refer to a material having an average sphericity of at least 0.70. Preferably, the composite particles of the invention have an average sphericity of at least 0.85, more preferably at least 0.90, more preferably at least 0.92, more preferably at least 0.93, more preferably at least 0.94, more preferably at least 0.95. Optionally, the composite particles may have an average sphericity of at least 0.96, or at least 0.97, or at least 0.98, or at least 0.99.

It will be understood that the circumference and area of a two-dimensional particle projection will depend on the orientation of the particle in the case of any particle which is not perfectly spheroidal. However, the effect of particle orientation may be offset by reporting sphericity and aspect ratios as average values obtained from a plurality of particles having random orientation. A number of SEM and dynamic image analysis instruments are commercially available, allowing the sphericity and aspect ratio of a particulate material to be determined rapidly and reliably. Unless stated otherwise, sphericity values as specified or reported herein are as measured by a CamSizer XT particle analyzer from Retsch Technology GmbH. The CamSizer XT is a dynamic image analysis instrument which is capable of obtaining highly accurate distributions of the size and shape for particulate materials in sample volumes of from 100 mg to 100 g, allowing properties such as average sphericity and aspect ratios to be calculated directly by the instrument.

The composite particles can be further characterised by their performance under thermogravimetric analysis (TGA) in air. This method of analysis relies on the principle that a weight gain is observed when electroactive materials are oxidized in air and at elevated temperature.

As defined herein, "surface silicon" is calculated from the initial mass increase in the TGA trace from a minimum between 150° C. and 500° C. to the maximum mass measured in the temperature range between 550° C. and 650° C., wherein the TGA is carried out in air with a temperature ramp rate of 10° C./min. This mass increase is assumed to result from the oxidation of surface silicon and therefore allows the percentage of surface silicon as a proportion of the total amount of silicon to be determined according to the following formula:

$$Y = 1.875 \times [(M_{max} - M_{min})/M_f] \times 100\%$$

Wherein Y is the percentage of surface silicon as a proportion of the total silicon in the sample, $M_{max}$ is the maximum mass of the sample measured in the temperature range between 550° C. to 650° C., $M_{min}$ is the minimum mass of the sample above 150° C. and below 500° C., and $M_f$ is the mass of the sample at completion of oxidation at 1400° C. For completeness, it will be understood that 1.875 is the molar mass ratio of $SiO_2$ to $O_2$ (i.e. the mass ratio of $SiO_2$ formed to the mass increase due to the addition of oxygen). Typically, the TGA analysis is carried out using a sample size of 10 mg±2 mg.

It has been found that reversible capacity retention over multiple charge/discharge cycles is considerably improved when the surface silicon as determined by the TGA method described above is at least 20 wt % of the total amount of silicon in the material. Preferably at least 22 wt %, or at least 25 wt %, at least 30 wt % of the silicon, or at least 35 wt % of the silicon, or at least 40 wt % of the silicon, or at least 45 wt % of the silicon is surface silicon as determined by thermogravimetric analysis (TGA).

In addition to high surface silicon content, the particulate material of the invention preferably has a low content of coarse bulk silicon as determined by TGA. Coarse bulk silicon is defined herein as silicon which undergoes oxidation above 800° C. as determined by TGA, wherein the TGA is carried out in air with a temperature ramp rate of 10° C./min. The coarse bulk silicon content is therefore determined according to the following formula:

$$Z = 1.875 \times [(M_f - M_{800})/M_f] \times 100\%$$

Wherein Z is the percentage of unoxidized silicon at 800° C., $M_{800}$ is the mass of the sample at 800° C., and $M_f$ is the mass of ash at completion of oxidation at 1400° C. For the purposes of this analysis, it is assumed that any mass increase above 800° C. corresponds to the oxidation of silicon to $SiO_2$ and that the total mass at completion of oxidation is $SiO_2$. Typically, the TGA analysis is carried out using a sample size of 10 mg±2 mg.

Silicon that undergoes oxidation above 800° C. is less desirable. Preferably, no more than 10 wt %, or no more than 8 wt %, or no more than 6 wt %, or no more than 5 wt %, or no more than 4 wt %, or no more than 3 wt %, or no more than 2 wt %, or no more than 1.5 wt % of the silicon is coarse bulk silicon as determined by TGA.

Preferably, at least 20 wt % of the silicon is surface silicon and no more than 10 wt % of the silicon is coarse bulk silicon, wherein both are determined by TGA. More preferably, at least 30 wt % of the silicon is surface silicon and no more than 10 wt % of the silicon is coarse hulk silicon, wherein both are determined by TGA. More preferably, at least 35 wt % of the silicon is surface silicon and no more than 8 wt % of the silicon is coarse bulk silicon, wherein both are determined by TGA. More preferably, at least 40 wt % of the silicon is surface silicon and no more than 5 wt % of the silicon is coarse bulk silicon, wherein both are determined by TGA. More preferably, at least 45 wt % of the silicon is surface silicon and no more than 2 wt % of the silicon is coarse bulk silicon, wherein both are determined by TGA.

The composite particles preferably have a specific charge capacity on first lithiation of 1200 to 2340 mAh/g. Preferably, the composite particles have a specific charge capacity on first lithiation of at least 1400 mAh/g.

The composite particles may include a coating of a lithium ion permeable material, such as a carbon coating. A lithium ion permeable material coating has the advantages that it further reduces the BET surface area of the composite particles by smoothing any surface defects and by filling any remaining surface microporosity, thereby further reducing first cycle loss. In addition, a lithium ion permeable material coating improves the conductivity of the surface of the composite particles, reducing the need for conductive additives in the electrode composition, and also creates an optimum surface for the formation of a stable SEI layer, resulting in improved capacity retention on cycling.

A reduction in the surface area of the composite particles also has the effect of reducing the amount of binder that is needed to form an electrode active layer comprising the composite particles. Excess binder is known to contribute to a reduction in rate performance. A further advantage of the invention is that the filler contributes to improved compressive strength of the composite particles by providing structural reinforcement to the porous particle framework.

When a carbon coating is present, the composite particles preferably have a BET surface area of no more than 150 $m^2/g$, or no more than 100 $m^2/g$, or no more than 80 $m^2/g$, or no more than 60 $m^2/g$, or no more than 40 $m^2/g$, or no more than 30 $m^2/g$, or no more than 25 $m^2/g$, or no more than 20 $m^2/g$, or no more than 15 $m^2/g$, or no more than 10 $m^2/g$, or no more than 5 $m^2/g$, or no more than 3 $m^2/g$.

In a second aspect, the invention provides a process for preparing composite particles, the process comprising the steps of:
(a) providing a plurality of porous particles comprising micropores and/or mesopores, wherein the total pore volume of micropores and mesopores as measured by gas adsorption is in the range from 0.4 to 2.2 $cm^3/g$;
(b) contacting the porous particles with a precursor of an electroactive material at a temperature effective to cause deposition of a plurality of electroactive material domains in the pores of the porous particles;
(c) forming a plurality of modifier material domains in the pores of the porous particles and adjacent the electroactive material domains deposited in step (b).
(d) contacting the particles from step (c) with a precursor of an electroactive material at a temperature effective to cause deposition of further electroactive material domains in the pores of the porous particles and adjacent the modifier material domains formed in step (c).

The process of the invention is therefore a multistep process comprising, in sequence, a first step of depositing an electroactive material, a step of forming a modifier material adjacent to the electroactive material, and a further step of depositing an electroactive material adjacent to the modifier material. The result of this sequence of steps is that at least a portion of the modifier material domains in the product from step (d) are located between the electroactive material domains deposited in step (b) and the electroactive material domains deposited in step (d). Accordingly, the product of the process of the second aspect of the invention is a particulate material according to the first aspect of the invention.

As discussed above, the porous particles used in step (a) form the porous particle framework in the composite particles. The term "porous particle framework" is used in the context of the composite particle product, whereas the term "porous particles" is used to describe the starting material which ultimately forms the porous particle framework. Accordingly, the porous particles used in step (a) of the process of the second aspect of the invention may have any of the features described herein the porous particle framework in the context of the first aspect of the invention. The features of the porous particle framework may optionally be combined with any of the additional features of the porous particles set out below.

In general, the porous particles may have a $D_{50}$ particle diameter in the range from 0.5 to 200 μm. Optionally, the $D_{50}$ particle diameter of the porous particles may be at least 1 μm, or at least 1.5 μm, or at least 2 μm, or at least 2.5 μm, or at least 3 μm, or at least 4 μm, or at least 5 μm. Optionally the $D_{50}$ particle diameter of the porous particles may be no more than 150 μm, or no more than 100 μm, or no more than 70 μm, or no more than 50 μm, or no more than 40 μm, or no more than 30 μm, or no more than 25 μm, or no more than 20 μm, or no more than 18 μm, or no more than 15 μm, or no more than 12 μm, or no more than 10 μm, or no more than 8 μm.

For instance, the porous particles may have a $D_{50}$ particle diameter in the range from 0.5 to 150 μm, or from 0.5 to 100 μm, or from 0.5 to 50 μm, or from 0.5 to 30 μm, or from 1 to 25 μm, or from 1 to 20 μm, or from 2 to 25 μm, or from 2 to 20 μm, or from 2 to 18 μm, or from 2 to 15 μm, or from 2 to 12 μm, or from 2.5 to 15 μm, or from 2.5 to 12 μm, or from 2 to 10 μm, or from 3 to 20 μm, or from 3 to 18 μm, or from 3 to 15 μm, or from 4 to 18 μm, or from 4 to 15 μm, or from 4 to 12 μm, or from 5 to 15 μm, or from 5 to 12 μm or from 5 to 10 μm, or from 5 to 8 μm. Particles within these size ranges and having porosity and a pore diameter distribution as set out herein are ideally suited for the preparation of composite particles for use in anodes for metal-ion batteries by a CVI process.

The $D_{10}$ particle diameter of the porous particles is preferably at least 0.2 μm, or at least 0.5 μm, or at least 0.8 μm, or at least 1 μm, or at least 1.5 μm, or at least 2 μm. By maintaining the $D_{10}$ particle diameter at 0.2 μm or more, the potential for undesirable agglomeration of sub-micron sized particles is reduced, and improved dispersibility of the composite particles formed.

The $D_{90}$ particle diameter of the porous particles is preferably no more than 300 μm, or no more than 250 μm, or no more than 200 μm, or no more than 150 μm, or no more than 100 μm, or no more than 80 μm, or no more than 60 μm, or no more than 40 μm, or no more than 30 μm, or no more than 25 μm, or no more than 20 μm.

The porous particles preferably have a narrow size distribution span. For instance, the particle size distribution span (defined as $(D_{90}-D_{10})/D_{50}$) is preferably 5 or less, more preferably 4 or less, more preferably 3 or less, more preferably 2 or less, and most preferably 1.5 or less. By maintaining a narrow size distribution span, efficient packing of the particles into dense powder beds is more readily achievable.

The porous particles preferably have a BET surface area of at least 100 m$^2$/g, or at least 500 m$^2$/g, or at least 750 m$^2$/g, or at least 1,000 m$^2$/g. The term "BET surface area" as used herein should be taken to refer to the surface area per unit mass calculated from a measurement of the physical adsorption of gas molecules on a solid surface, using the Brunauer-Emmett-Teller theory, in accordance with ISO 9277. Preferably, the BET surface area of the porous particles is no more than 4,000 m$^2$/g, or no more than 3,500 m$^2$/g, or no more than 3,250 m$^2$/g, or no more than 3,000 m$^2$/g or no more than 2,500 m$^2$/g, or no more than 2,000 m$^2$/g. For example, the porous particles may have a BET surface area in the range from 100 m$^2$/g to 4,000 m$^2$/g, or from 500 m$^2$/g to 4,000 m$^2$/g, or from 750 m$^2$/g to 3,500 m$^2$/g, or from 1,000 m$^2$/g to 3,250 m$^2$/g, 1,000 m$^2$/g to 3,000 m$^2$/g or from 1,000 m$^2$/g to 2,500 m$^2$/g, or from 1,000 m$^2$/g to 2,000 m$^2$/g.

The porous particles may have an average sphericity (as defined above) of more than 0.5. Preferably they have an average sphericity of at least 0.55, or at least 0.6, or at least 0.65, or at least 0.7, or at least 0.75, or at least 0.8, or at least 0.85. Preferably, the porous particles have an average sphericity of at least 0.90, or at least 0.92, or at least 0.93, or at least 0.94, or at least 0.95.

Preferably the porous particles have:
  (i) a total pore volume of micropores and mesopores as measured by nitrogen gas adsorption in the range from 0.4 to 2.2 cm$^3$/g;
  (ii) a $PD_{50}$ pore diameter of no more than 20 nm, preferably a $PD_{90}$ pore diameter of no more than 30 nm, preferably a $PD_{30}$ pore diameter of no more than 15 nm; and
  (iii) a $D_{50}$ particle diameter in the range from 0.5 to 30 μm; and optionally
  (iv) a particle size distribution span $(D_{90}-D_{10})/D_{50}$) of 5 or less.

More preferably the porous particles have:
  (i) a total pore volume of micropores and mesopores as measured by nitrogen gas adsorption in the range from 0.6 to 1.8 cm$^3$/g;
  (ii) a $PD_{50}$ pore diameter of no more than 10 nm, preferably a $PD_{90}$ pore diameter of no more than 20 nm, preferably a $PD_{30}$ pore diameter of no more than 8 nm; and
  (iii) a $D_{50}$ particle diameter in the range from 1 to 25 μm; and optionally
  (iv) a particle size distribution span $(D_{90}-D_{10})/D_{50}$) of 5 or less.

More preferably the porous particles have:
  (i) a total pore volume of micropores and mesopores as measured by nitrogen gas adsorption in the range from 0.7 to 1.6 cm$^3$/g;
  (ii) a $PD_{50}$ pore diameter of no more than 10 nm, preferably a $PD_{90}$ pore diameter of no more than 20 nm, preferably a $PD_{30}$ pore diameter of no more than 8 nm; and
  (iii) a $D_{50}$ particle diameter in the range from 1 to 20 μm; and optionally
  (iv) a particle size distribution span $(D_{90}-D_{10})/D_{50}$) of 5 or less.

More preferably the porous particles have:
  (i) a total pore volume of micropores and mesopores as measured by nitrogen gas adsorption in the range from 0.7 to 1.5 cm$^3$/g;
  (ii) a $PD_{50}$ pore diameter of no more than 5 nm, preferably a $PD_{90}$ pore diameter of no more than 10 nm, preferably a $PD_{30}$ pore diameter of no more than 3 nm; and
  (iii) a $D_{50}$ particle diameter in the range from 2 to 20 μm; and optionally
  (iv) a particle size distribution span $(D_{90}-D_{10})/D_{50}$) of 5 or less.

More preferably the porous particles have:
(i) a total pore volume of micropores and mesopores as measured by nitrogen gas adsorption in the range from 0.7 to 1.4 cm$^3$/g;
(ii) a $PD_{50}$ pore diameter of no more than 5 nm, preferably a $PD_{90}$ pore diameter of no more than 10 nm, preferably a $PD_{30}$ pore diameter of no more than 3 nm; and
(iii) a $D_{50}$ particle diameter in the range from 2 to 20 μm; and optionally
(iv) a particle size distribution span $(D_{90}-D_{10})/D_{50}$ of 5 or less.

More preferably the porous particles have:
(i) a total pore volume of micropores and mesopores as measured by nitrogen gas adsorption in the range from 0.7 to 1.4 cm$^3$/g;
(ii) a $PD_{50}$ pore diameter of no more than 5 nm, preferably a $PD_{90}$ pore diameter of no more than 10 nm, preferably a $PD_{30}$ pore diameter of no more than 3 nm; and
(iii) a $D_{50}$ particle diameter in the range from 2 to 18 μm; and optionally
(iv) a particle size distribution span $(D_{90}-D_{10})/D_{50}$ of 5 or less.

More preferably the porous particles have:
(i) a total pore volume of micropores and mesopores as measured by nitrogen gas adsorption in the range from 0.7 to 1.4 cm$^3$/g;
(ii) a $PD_{50}$ pore diameter of no more than 2 nm, preferably a $PD_{90}$ pore diameter of no more than 5 nm, preferably a $PD_{30}$ pore diameter of no more than 1 nm; and
(iii) a $D_{50}$ particle diameter in the range from 2 to 15 μm; and optionally
(iv) a particle size distribution span $(D_{90}-D_{10})/D_{50}$ of 5 or less.

The composite particles may have:
(i) a $D_{10}$ particle diameter of at least 0.5 μm;
(ii) a $D_{90}$ particle diameter of no more than 50 μm; and
(iii) a total volume of micropores and mesopores of no more than 0.35 cm$^3$/g; and optionally
(iv) a particle size distribution span $(D_{90}-D_{10})/D_{50}$ of 5 or less.

The composite particles may have:
(i) a $D_{10}$ particle diameter of at least 0.8 μm;
(ii) a $D_{90}$ particle diameter of no more than 40 μm; and
(iii) a total volume of micropores and mesopores of no more than 0.35 cm$^3$/g; and optionally
(iv) a particle size distribution span $(D_{90}-D_{10})/D_{50}$ of 5 or less.

The composite particles may have:
(i) a $D_{10}$ particle diameter of at least 0.8 μm;
(ii) a $D_{90}$ particle diameter of no more than 30 μm; and
(iii) a total volume of micropores and mesopores of no more than 0.35 cm$^3$/g; and optionally
(iv) a particle size distribution span $(D_{90}-D_{10})/D_{50}$ of 5 or less.

The composite particles may have:
(i) a $D_{10}$ particle diameter of at least 1 μm;
(ii) a $D_{90}$ particle diameter of no more than 25 μm; and
(iii) a total volume of micropores and mesopores of no more than 0.25 cm$^3$/g; and optionally
(iv) a particle size distribution span $(D_{90}-D_{10})/D_{50}$ of 5 or less.

The composite particles may have:
(i) a total oxygen content of less than 5 wt % based on the total mass of the composite particles;
(ii) from 40 to 70 wt % of silicon based on the total mass of the composite particles; and
(iii) a BET surface area of no more than 30 m$^2$/g; and optionally
(iv) a particle size distribution span $(D_{90}-D_{10})/D_{50}$ of 5 or less.

The composite particles may have:
(i) a total oxygen content of less than 5 wt % based on the total mass of the composite particles;
(ii) from 40 to 60 wt % of silicon based on the total mass of the composite particles; and
(iii) a BET surface area of no more than 20 m$^2$/g; and optionally
(iv) a particle size distribution span $(D_{90}-D_{10})/D_{50}$ of 5 or less.

The composite particles may have:
(i) a total oxygen content of less than 5 wt % based on the total mass of the composite particles;
(ii) from 40 to 60 wt % of silicon based on the total mass of the composite particles; and
(iii) a BET surface area of no more than 15 m$^2$/g; and optionally
(iv) a particle size distribution span $(D_{90}-D_{10})/D_{50}$ of 5 or less.

Composite particles having these preferred total oxygen content, silicon content and BET surface area are thought to have improved cycle life and energy capacity.

The composite particles may have:
(i) a $D_{10}$ particle diameter of at least 0.5 μm;
(ii) a $D_{90}$ particle diameter of no more than 50 μm;
(iii) a total volume of micropores and mesopores of no more than 0.35 cm$^3$/g.
(iv) a total oxygen content of less than 5 wt % based on the total mass of the composite particles;
(v) from 40 to 70 wt % of silicon based on the total mass of the composite particles; and
(vi) a BET surface area of no more than 30 m$^2$/g; and optionally
(vii) a particle size distribution span $(D_{90}-D_{10})/D_{50}$ of 5 or less.

The composite particles may have:
(i) a $D_{10}$ particle diameter of at least 0.8 μm;
(ii) a $D_{90}$ particle diameter of no more than 40 μm;
(iii) a total volume of micropores and mesopores of no more than 0.35 cm$^3$/g.
(iv) a total oxygen content of less than 5 wt % based on the total mass of the composite particles;
(v) from 40 to 60 wt % of silicon based on the total mass of the composite particles; and
(vi) a BET surface area of no more than 20 m$^2$/g; and optionally
(vii) a particle size distribution span $(D_{90}-D_{10})/D_{50}$ of 5 or less.

The composite particles may have:
(i) a $D_{10}$ particle diameter of at least 0.8 μm;
(ii) a $D_{90}$ particle diameter of no more than 30 μm;
(iii) a total volume of micropores and mesopores of no more than 0.35 cm$^3$/g.
(iv) a total oxygen content of less than 5 wt % based on the total mass of the composite particles;
(v) from 40 to 60 wt % of silicon based on the total mass of the composite particles; and
(vi) a BET surface area of no more than 15 m$^2$/g; and optionally
(vii) a particle size distribution span $(D_{90}-D_{10})/D_{50}$ of 5 or less.

The composite particles may have:
(i) a $D_{10}$ particle diameter of at least 1 μm;
(ii) a $D_{90}$ particle diameter of no more than 25 μm; and
(iii) a total volume of micropores and mesopores of no more than 0.25 cm$^3$/g.
(iv) a total oxygen content of less than 5 wt % based on the total mass of the composite particles;
(v) from 40 to 60 wt % of silicon based on the total mass of the composite particles; and
(vi) a BET surface area of no more than 15 m$^2$/g; and optionally
(vii) a particle size distribution span $(D_{90}-D_{10})/D_{50}$ of 5 or less.

The foregoing preferred features of the porous particles also apply to the porous particle frameworks in the composite particles of the first aspect of the invention.

The electroactive materials deposited in steps (b) and (d) may be the same or different, and may optionally be independently selected from silicon, tin, germanium, aluminium and mixtures and alloys thereof. A preferred electroactive material is silicon. Preferably, the electroactive material deposited in at least one of steps (b) and (d) is silicon. More preferably, both the electroactive material deposited in each one of steps (b) and (d) is silicon.

Suitable precursors of silicon include silane ($SiH_4$), disilane ($Si_2H_6$), trisilane ($Si_3H_8$), tetrasilane ($Si_4H_{10}$), methylsilane ($CH_3SiH_3$), dimethylsilane (($CH_3)_2SiH_2$), or chlorosilanes such as trichlorosilane ($HSiCl_3$) or methylchlorosilanes such as methyltrichlorosilane ($CH_3SiCl_3$) or dimethyldichlorosilane (($CH_3)_2SiCl_2$). A preferred precursor of silicon is silane.

Suitable precursors of tin include bis[bis(trimethylsilyl)amino]tin(II) ($[[(CH_3)_3Si]_2N]_2Sn$), tetraallyltin (($H_2C=CHCH_2)_4Sn$), tetrakis(diethylamido)tin(IV) ($[(C_2H_5)_2N]_4Sn$), tetrakis(dimethylamido)tin(IV) ($[(CH_3)_2N]_4Sn$), tetramethyltin ($Sn(CH_3)_4$), tetravinyltin ($Sn(CH=CH_2)_4$), tin(II) acetylacetonate ($C_{10}H_{14}O_4Sn$), trimethyl(phenylethynyl) tin ($C_6H_5C\equiv CSn(CH_3)_3$), and trimethyl(phenyl) tin ($C_6H_5Sn(CH_3)_3$). A preferred precursor of tin is tetramethyltin.

Suitable precursors of aluminium include aluminium tris (2,2,6,6-tetramethyl-3,5-heptanedionate) ($Al(OCC(CH_3)_3CHCOC(CH_3)_3)_3$), trimethylaluminium (($CH_3)_3Al$), and tris (dimethylamido)aluminium (III) ($Al(N(CH_3)_2)_3$). A preferred precursor of aluminium is trimethylaluminium.

Suitable precursors of germanium include germane ($GeH_4$), hexamethyldigermanium (($CH_3)_3GeGe(CH_3)_3$), tetramethylgermanium (($CH_3)_4Ge$), tributylgermanium hydride ($[CH_3(CH_2)_3]_3GeH$), triethylgermanium hydride (($C_2H_5)_3GeH$), and triphenylgermanium hydride (($C_6H_5)_3GeH$). A preferred precursor of germanium is germane.

In the case that the precursor is a chlorinated compound, such as a chlorosilane, the precursor is used in admixture with hydrogen gas, preferably in at least a 1:1 atomic ratio of hydrogen to chlorine.

Optionally, the precursor is free of chlorine. Free of chlorine means that the precursor contains less than 1 wt %, preferably less than 0.1 wt %, preferably less than 0.01 wt % of chlorine-containing compounds.

The precursors in steps (b) and (d) may be used either in pure form (or substantially pure form) or as a diluted mixture with an inert carrier gas, such as nitrogen or argon. When in a diluted mixture with an inert carrier gas, the precursor is may be used in an amount in the range from 1 to 95 vol %, or 1 to 85 vol %, or 1 to 70 vol %, or 1 to 50 vol %, or 2 to 40 vol %, or 5 to 30 vol %, or from 5 to 25 vol % based on the total gaseous volume of the precursor and an inert carrier gas. The presence of oxygen should be minimised to prevent undesired oxidation of the deposited electroactive material, in accordance with conventional procedures for working in an inert atmosphere. Preferably, the oxygen content is less than 0.01 vol %, more preferably less than 0.001 vol % based on the total volume of gas used in steps (b) and (d).

The temperature in steps (b) and (d) is any temperature that is effective to decompose the precursor to form the electroactive material. Preferably, the temperature in steps (b) and (d) is independently in the range from 300 to 800° C., or 350 to 800° C., or 380 to 700° C., or from 380 to 650° C., or from 380 to 600° C., or from 380 to 550° C., or from 380 to 500° C., or from 400 to 450° C., or from 450 to 500° C. More preferably, the temperature in each of steps (b) and (d) is independently in the range of 380-500° C., preferably 420-480° C. Optionally, the temperature is substantially the same in steps (b) and (d).

The operating pressure in steps (b) and (d) may be below, above or at atmospheric pressure. Optionally, the pressure in at least one of steps (b) and (d) is maintained at less than 200 kPa, or at or below 150 kPa, or at or below 120 kPa, or at or below 110 kPa, or at or below 100 kPa, or at or below 90 kPa, or at or below 80 kPa, or at or below 70 kPa, or at or below 60 kPa, or at or below 50 kPa.

For example, the pressure in at least step (b) is maintained at less than 200 kPa, or at or below 150 kPa, or at or below 120 kPa, or at or below 110 kPa, or at or below 100 kPa, or at or below 90 kPa, or at or below 80 kPa, or at or below 70 kPa, or at or below 60 kPa, or at or below 50 kPa.

Optionally, the pressure in both of steps (b) and (d) may be maintained at less than 200 kPa, or at or below 150 kPa, or at or below 120 kPa, or at or below 110 kPa, or at or below 100 kPa, or at or below 90 kPa, or at or below 80 kPa, or at or below 70 kPa, or at or below 60 kPa, or at or below 50 kPa.

References to the pressure in any step of the claimed process refer to the absolute pressure in the reaction zone, which may comprise suitable form of reactor vessel.

The deposition of electroactive materials by CVI results in the elimination of by-products, particularly by-product gases such as hydrogen. Step (b) and/or step (d) preferably further comprises separating by-products. Separation of by-products from the particles formed in step (b) and/or step (d) may be effected by flushing the reactor with an inert gas and/or by evacuating the reactor by reducing the pressure. For example, the separation of by-products from the intermediate particles formed in step (b) may be effected by evacuating the reactor to a pressure of less than 100 kPa, or less than 80 kPa, or less than 60 kPa, or less than 40 kPa, or less than 20 kPa, or less than 10 kPa, or less than 5 kPa, or less than 2 kPa, or less than 1 kPa. Evacuating the reactor to low pressure may be effective not only to remove by-products in the gas phase, but also to desorb any by-products that may be adsorbed onto the surfaces of the deposited electroactive material.

The modifier material formed in step (c) may optionally be a passivation layer formed on the surface of the electroactive material deposited in step (b). Accordingly, step (c) may further comprise contacting the intermediate particles from step (b) with a passivating agent. As set out above, a passivating agent is a compound or mixture of compounds which is able to react with the surface of the electroactive material deposited in step (b) to form a modified surface. Any of the passivating agents described in connection with the first aspect of the invention may be used in step (c).

Contacting of the electroactive material with the passivating agent in step (c) may be carried out at a temperature in the range of 25 to 800° C., preferably at a temperature in the range of from 50 to 500° C., more preferably from 100 to 300° C.

The formation of a native oxide layer is exothermic and therefore requires careful process control to prevent overheating or even combustion of the particulate material. In the case that the modifier material formed in step (c) is a native oxide layer, step (c) may comprise cooling the material formed in step (b) to a temperature below 300° C., preferably below 200° C., optionally below 100° C., prior to contacting the surface of the electroactive material domains with the oxygen containing gas.

The modifier material formed in step (c) may be a nitride of the electroactive material domains. Step (c) may comprise contacting the surface of the electroactive material domains with ammonia. A nitride layer may be formed by contacting the surface of the electroactive material domains with ammonia at a temperature in the range from 200-700° C., preferably from 400-700° C., more preferably from 400-600° C. The temperature may then be increased if necessary into the range of 500 to 1,000° C. to form a nitride surface (e.g. a silicon nitride surface of the formula SiNx, wherein $x \leq 4/3$). For example, where ammonia is used, step (c) may be carried out at the same or similar temperature as is used to deposit the electroactive material domains in step (b). As sub-stoichiometric silicon nitride is conductive, this step will also result in the formation of a conductive network that will allow for faster charging and discharge of the electroactive material.

Another type of modifier material is an oxynitride layer. Step (c) may comprise exposing the surface of the electroactive material domains to ammonia (or another nitrogen containing molecule) and oxygen gas. In the case that the electroactive material domains comprise silicon, the modifier material domains may comprise a silicon oxynitride of the formula SiOxNy, wherein $0<x<2$, $0<y<4/3$, and $0<(2x+3y)\leq 4$). The silicon nitride is preferably amorphous silicon oxynitride.

As a further option, an amorphous or nanocrystalline carbide layer may be formed. Step (c) may comprise contacting the surface of the electroactive material domains with carbon containing precursors, e.g. methane or ethylene, at a temperature in the range from 250 to 700° C. At lower temperatures, covalent bonds are formed between the surface of the electroactive material and the carbon-containing precursors, which are the converted to a monolayer of crystalline silicon carbide as the temperature is increased. In the case that the electroactive material domains comprise silicon, the modifier material domains may comprise a silicon carbide of the formula SiCx, wherein $0<x\leq 1$. The silicon carbide is preferably amorphous silicon carbide.

Other suitable passivating agents include compounds comprising an alkene, alkyne or carbonyl functional group, more preferably a terminal alkene, terminal alkyne, aldehyde or ketone group. Suitable passivating agents of these types are described above.

Other suitable passivating agents include compounds including an active hydrogen atom bonded to oxygen, nitrogen, sulphur or phosphorus. For example, the passivating agent may be an alcohol, amine, thiol or phosphine. Reaction of the group —XH with hydride groups at the surface of the electroactive material is understood to result in elimination of $H_2$ and the formation of a direct bond between X and the electroactive material surface. Suitable passivating agents of these types are described above.

The modifier material formed in step (c) may optionally comprise a pyrolytic carbon material deposited onto the surface of the electroactive material by thermal decomposition of a carbon-containing precursor, i.e. by a chemical vapour infiltration (CVI) method. Deposition of a pyrolytic carbon material in step (c) may be advantageous as it forms a conductive network between electroactive material domains which may facilitate electron transport within the composite particles. Step (c) may therefore comprise contacting the intermediate particles from step (b) with a carbon-containing precursor, preferably a hydrocarbon, at a temperature effective to cause deposition of a pyrolytic carbon material in the pores of the intermediate particles.

Suitable hydrocarbons include polycyclic hydrocarbons comprising from 10 to 25 carbon atoms and optionally from 1 to 3 heteroatoms, optionally wherein the polyaromatic hydrocarbon is selected from naphthalene, substituted naphthalenes such as di-hydroxynaphthalene, anthracene, tetracene, t pentacene, fluorene, acenapthene, phenanthrene, fluoranthrene, pyrene, chrysene, perylene, coronene, fluorenone, anthraquinone, anthrone and alkyl-substituted derivatives thereof. Suitable pyrolytic carbon precursors also include bicyclic monoterpenoids, optionally wherein the bicyclic monoterpenoid is selected from camphor, borneol, eucalyptol, camphene, careen, sabinene, thujene and pinene. Further suitable pyrolytic carbon precursors include $C_2$-$C_{10}$ hydrocarbons, optionally wherein the hydrocarbons are selected from alkanes, alkenes, alkynes, cycloalkanes, cycloalkenes, and arenes, for example methane, ethylene, propylene, limonene, styrene, cyclohexane, cyclohexene, α-terpinene and acetylene. Other suitable pyrolytic carbon precursors include phthalocyanine, sucrose, starches, graphene oxide, reduced graphene oxide, pyrenes, perhydropyrene, triphenylene, tetracene, benzopyrene, perylenes, coronene, and chrysene. A preferred carbon precursor is acetylene.

A suitable temperature for the deposition of a pyrolytic carbon material in step (c) is in the range from 300 to 800° C., or from 400 to 800° C. For example, the temperature may be no more than 750° C., or no more than 700° C., or no more than 680° C. or no more than 660° C., or no more than 640° C. or no more than 620° C., or no more than 600° C., or no more than 580° C., or no more than 560° C., or no more than 540° C., or no more than 520° C., or no more than 500° C. The minimum temperature will depend on the type of carbon precursor that is used. Preferably, the temperature is at least 300° C., or at least 350° C., or at least 400° C., or at least 450° C., or at least 500° C.

The carbon-containing precursors used in step (c) may be used in pure form, or diluted mixture with an inert carrier gas, such as nitrogen or argon. For instance, the carbon-containing precursor may be used in an amount in the range from 0.1 to 100 vol %, or 0.5 to 20 vol %, or 1 to 10 vol %, or 1 to 5 vol % based on the total volume of the precursor and the inert carrier gas. The presence of oxygen should be minimised to prevent undesired oxidation of the deposited electroactive material. Preferably, the oxygen content is less than 0.01 vol %, more preferably less than 0.001 vol % based on the total volume of gas.

In the case that a pyrolytic carbon material is deposited in step (c), the same compound may function as both a passivating agent and the pyrolytic carbon precursor. For example, if styrene is selected as the pyrolytic carbon precursor, then it will also function as a passivating agent if the intermediate particles from step (b) are not exposed to oxygen prior to contact with styrene. In this case, passivation and deposition of the conductive carbon material in steps may be carried out simultaneously, for example at a temperature in the range of from 300-700° C. Alternatively, passivation and deposition of the conductive carbon material may be carried out sequentially, with the same material as the passivating agent and the pyrolytic carbon precursor, but wherein the deposition of the pyrolytic carbon precursor is carried out at a higher temperature than the passivation. For example, passivation may be carried out at a temperature in the range of from 25° C. to less than 300° C., and deposition of pyrolytic carbon may be carried out at a temperature in the range from 300-700° C. These two steps may suitably be carried out sequentially by increasing the temperature while maintaining contact with the compound that functions as both a passivating agent and the pyrolytic carbon precursor. At lower temperatures (e.g. in the range of 25° C. to <300° C.) passivation will be the primary process. As the temperature is increased (e.g. to 300-700° C.) the deposition of pyrolytic carbon will ensue.

As a further option, step (c) may comprise depositing a layer of a conductive metal or metal alloy as the modifier material onto the surface of the electroactive material domains. A conductive metal layer or metal alloy may be obtained by a chemical vapour infiltration (CVI) method. Examples of suitable conductive metals include silver, gold, copper and titanium.

The formation of a conductive metal or metal alloy modifier material in step (c) may optionally be carried out following passivation of the surface of the electroactive material domains by one of the processes described above. Accordingly, the modifier material formed in step (c), may comprise both a passivation layer on the surface of the electroactive material domains and a conductive metal or metal alloy layer.

As a further alternative, step (c) may comprise forming modifier material domains that comprise an electroactive material comprising a dopant selected from the group consisting of boron, aluminium, gallium, indium, phosphorus, arsenic, antimony and bismuth. The doped electroactive material may be formed by a CVI method in which the porous particles are contacted simultaneously with both a precursor of electroactive material and dopant.

Alternatively, the doped electroactive material may be formed by contacting deposited electroactive material with a dopant.

As a further alternative, step (c) may comprise forming a solid-state electrolyte as the modifier material.

As a further alternative, step (c) may comprise forming an inert filler as the modifier material.

Depending on the amount of electroactive material deposited in each step, the process of the invention may be operated as a multi-pass process in which steps (c) and (d) are repeated as many times as necessary to deposit the target amount of electroactive material. For example, steps (c) and (d) may be carried out from 2 to 15 times, giving a total of from 3 to 16 electroactive material depositions steps including step (b) and the repetitions of step (d).

When steps (c) and (d) are repeated, each instance of step (c) and (d) is independently as described above. For instance, each repetition of step (c) may comprise the formation of the same or a different modifier material. Likewise, the electroactive materials deposited in each repetition of step (d) may be the same or different, and may be the same or different again from the electroactive material deposited in step (b). Preferably, the electroactive material deposited in at least one of steps (b) and the repeated steps (d) is silicon. More preferably, the electroactive material deposited in each of steps (b) and the repeated steps (d) is silicon.

When steps (c) and (d) are repeated, the particles used in the repetition of step (c) are intermediate particles obtained from the preceding step (d). Accordingly, any references herein to "particles from step (b)" in the description of step (c) shall be interpreted "as particles from the preceding step (d)" in the case of any repetition of step (c).

The process of the invention optionally further comprises the step:

(e) forming a plurality of modifier material domains in the pores and/or on the outer surface of the composite particles from step (d).

Step (e) is carried out immediately after the final electroactive material deposition step (i.e. step (d), or the final repetition of step (d) in the case that steps (c) and (d) are repeated). The formation of modifier material domains in step (e) is an analogous process to step (c) as described above, except that step (e) is performed after the final electroactive material deposition step (the final step (d)), whereas step (c) is performed between consecutive electroactive material deposition steps. Any of the modifier materials and deposition conditions as set out above in relation to step (c) also apply to step (e).

The modifier material domains formed in step (e) may comprise the same or different modifier materials from the modifier material domains formed in step (c).

Optionally, step (e) comprises contacting the composite particles from step (d) with a passivating agent. Preferred passivating agents and passivation conditions as set out above in relation to step (c) also apply to passivation in step (e).

The modifier material domains formed in step (e) may be native oxides of the electroactive material. In this case, it is preferred that the modifier material domains formed in step (c) (and any repetitions of step (c)) are not native oxides of the electroactive material.

Optionally, step (e) comprises depositing a lithium ion permeable material into the pores and/or onto the outer surface of the composite particles from step (d). This provides a further improvement in the performance of the composite particles when used as an electroactive material for lithium-ion batteries, by reducing the surface area of the composite particles and by sealing the electroactive material domains away from electrolyte access.

A lithium ion permeable material may be deposited immediately after the final electroactive material deposition step (i.e. step (d), or after the final step (d) in the event that steps (c) and (d) are repeated one or more times. Alternatively, a lithium ion permeable material may be deposited after first carrying out a passivation step in step (e) as discussed above.

A suitable lithium ion permeable material is a pyrolytic carbon material. A pyrolytic carbon material may be obtained by a chemical vapour infiltration (CVI) method, i.e. by thermal decomposition of a volatile carbon-containing gas (e.g. ethylene) onto the surface of the silicon-containing composite particles.

A suitable process for depositing a pyrolytic carbon material comprises combining the composite particles from the step (d) with a pyrolytic carbon precursor; and heating the pyrolytic carbon precursor to a temperature effective to cause the deposition of a pyrolytic conductive carbon material into the pores and/or onto the outer surface of the composite particles.

Preferred pyrolytic carbon precursors and pyrolysis conditions as set out above in relation to step (c) also apply to formation of a pyrolytic carbon material in steps (e).

In the case that the lithium-ion permeable material is a pyrolytic carbon material, the same compound may function as both a passivating agent and a pyrolytic carbon precursor in step (e). Suitable conditions for passivating and forming a pyrolytic carbon material using the same compound as the passivating agent and the pyrolytic carbon precursor in step (e) are the same as those described above in relation to step (c).

Alternatively, different compounds may be used as the passivating agent and as the pyrolytic carbon precursor. For example, the passivating agent could be styrene, and the pyrolytic carbon precursor could be a compound such as cyclohexane which is capable of forming a pyrolytic carbon material but is not capable of passivating the electroactive material surface.

In a preferred embodiment, the electroactive material deposited in steps (b) and (d) is elemental silicon and the modifier material domains formed in step (c) are passivation layers comprising an organic moiety covalently bonded to the surface of at least a portion of the elemental silicon domains formed in step (b). Optionally the process comprises step (e) and the modifier material domains formed in step (e) are silicon oxide domains formed by passivation using an oxygen containing gas.

In a further preferred embodiment, the electroactive material deposited in steps (b) and (d) is elemental silicon and the modifier material domains formed in step (c) are pyrolytic carbon domains. Optionally, the process comprises step (e) and the modifier material domains formed in step (e) are silicon oxide domains formed by passivation using an oxygen containing gas.

In a further preferred embodiment, the electroactive material deposited in steps (b) and (d) is elemental silicon and the modifier material domains formed in step (c) are metal or metal alloy domains. Optionally the process comprises step (e) and the modifier material domains formed in step (e) are silicon oxide domains formed by passivation using an oxygen containing gas.

In a further preferred embodiment, the electroactive material deposited in steps (b) and (d) is elemental silicon and the modifier material domains formed in step (c) are silicon oxide domains formed by passivation using an oxygen containing gas.

The process of the invention may be carried out in any reactor that is capable of contacting solids and gases at elevated temperatures. The porous particles and the forming composite particles may be present in the reactor in the form of a static bed of particles, or in the form of a moving or agitated bed of particles.

The product obtained from the process of the invention may have any of the features described herein with respect to the particulate material of the first aspect of the invention.

In a third aspect of the invention, there is provided a composition comprising composite particles according to the second aspect of the invention and at least one other component. In particular, there is provided a composition comprising composite particles according to the second aspect of the invention and at least one other component selected from: (i) a binder; (ii) a conductive additive; and (iii) an additional particulate electroactive material. A composition according to the invention is useful as an electrode composition, and thus may be used to form the active layer of an electrode.

The composition may be a hybrid electrode composition which comprises the composite particles and at least one additional particulate electroactive material. Examples of additional particulate electroactive materials include graphite, hard carbon, silicon, tin, germanium, aluminium and lead. The at least one additional particulate electroactive material is preferably selected from graphite and hard carbon, and most preferably the at least one additional particulate electroactive material is graphite.

In the case of a hybrid electrode composition, the composition may comprise from 1 to 95 wt %, or from 2 to 90 wt %, or from 5 to 85 wt %, or from 10 to 80 wt % of the particulate material, based on the total dry weight of the composition. The composition preferably comprises from 3 to 60 wt %, or from 3 to 50 wt %, or from 5 to 50 wt %, or from 10 to 50 wt %, or from 15 to 50 wt %, of the composite particles, based on the total dry weight of the composition.

The at least one additional particulate electroactive material is suitably present in an amount of from 20 to 95 wt %, or from 25 to 90 wt %, or from 30 to 75 wt % of the at least one additional particulate electroactive material.

The at least one additional particulate electroactive material preferably has a $D_{50}$ particle diameter in the range from 10 to 50 μm, preferably from 10 to 40 μm, more preferably from 10 to 30 μm and most preferably from 10 to 25 μm, for example from 15 to 25 μm.

The $D_{10}$ particle diameter of the at least one additional particulate electroactive material is preferably at least 5 μm, more preferably at least 6 μm, more preferably at least 7 μm, more preferably at least 8 μm, more preferably at least 9 μm, and still more preferably at least 10 μm.

The $D_{90}$ particle diameter of the at least one additional particulate electroactive material is preferably up to 100 μm, more preferably up to 80 μm, more preferably up to 60 μm, more preferably up to 50 μm, and most preferably up to 40 μm.

The at least one additional particulate electroactive material is preferably selected from carbon-comprising particles, graphite particles and/or hard carbon particles, wherein the graphite and hard carbon particles have a $D_{50}$ particle diameter in the range from 10 to 50 μm. Still more preferably, the at least one additional particulate electroactive material is selected from graphite particles, wherein the graphite particles have a $D_{50}$ particle diameter in the range from 10 to 50 μm.

The composition may also be a non-hybrid (or "high loading") electrode composition which is substantially free of additional particulate electroactive materials. In this context, the term "substantially free of additional particulate electroactive materials" should be interpreted as meaning that the composition comprises less than 15 wt %, preferably less than 10 wt %, preferably less than 5 wt %, preferably less than 2 wt %, more preferably less than 1 wt %, more preferably less than 0.5 wt % of any additional electroactive materials (i.e. additional materials which are capable of inserting and releasing metal ions during the charging and discharging of a battery), based on the total dry weight of the composition.

A "high-loading" electrode composition of this type preferably comprises at least 50 wt %, or at least 60 wt %, or at least 70 wt %, or at least 80 wt %, or at least 90 wt % of the composite particles according the invention, based on the total dry weight of the composition.

The composition may optionally comprise a binder. A binder functions to adhere the composition to a current collector and to maintain the integrity of the composition. Examples of binders which may be used in accordance with the present invention include polyvinylidene fluoride (PVDF), polyacrylic acid (PAA) and alkali metal salts thereof, modified polyacrylic acid (mPAA) and alkali metal salts thereof, carboxymethylcellulose (CMC), modified carboxymethylcellulose (mCMC), sodium carboxymethylcellulose (Na-CMC), polyvinylalcohol (PVA), alginates and alkali metal salts thereof, styrene-butadiene rubber (SBR) and polyimide. The composition may comprise a mixture of binders. Preferably, the binder comprises polymers selected from polyacrylic acid (PAA) and alkali metal salts thereof, and modified polyacrylic acid (mPAA) and alkali metal salts thereof, SBR and CMC.

The binder may suitably be present in an amount of from 0.5 to 20 wt %, preferably 1 to 15 wt %, preferably 2 to 10 wt % and most preferably 5 to 10 wt %, based on the total dry weight of the composition.

The binder may optionally be present in combination with one or more additives that modify the properties of the binder, such as cross-linking accelerators, coupling agents and/or adhesive accelerators.

The composition may optionally comprise one or more conductive additives. Preferred conductive additives are non-electroactive materials that are included so as to improve electrical conductivity between the electroactive components of the composition and between the electroactive components of the composition and a current collector. The conductive additives may be selected from carbon black, carbon fibers, carbon nanotubes, graphene, acetylene black, ketjen black, metal fibers, metal powders and conductive metal oxides. Preferred conductive additives include carbon black and carbon nanotubes.

The one or more conductive additives may suitably be present in a total amount of from 0.5 to 20 wt %, preferably 1 to 15 wt %, preferably 2 to 10 wt % and most preferably 5 to 10 wt %, based on the total dry weight of the composition.

The invention provides an electrode comprising a particulate material according to the invention in electrical contact with a current collector. The particulate material used to prepare the electrode may be in the form of a composition the invention.

As used herein, the term current collector refers to any conductive substrate that is capable of carrying a current to and from the electroactive particles in the composition. Examples of materials that can be used as the current collector include copper, aluminium, stainless steel, nickel, titanium and sintered carbon. Copper is a preferred material. The current collector is typically in the form of a foil or mesh having a thickness of between 3 to 500 µm. The particulate materials of the invention may be applied to one or both surfaces of the current collector to a thickness which is preferably in the range from 10 µm to 1 mm, for example from 20 to 500 µm, or from 50 to 200 µm.

The electrode of the invention may be fabricated by combining the particulate material of the invention with a solvent and optionally one or more viscosity modifying additives to form a slurry. The slurry is then cast onto the surface of a current collector and the solvent is removed, thereby forming an electrode layer on the surface of the current collector. Further steps, such as heat treatment to cure any binders and/or calendaring of the electrode layer may be carried out as appropriate. The electrode layer suitably has a thickness in the range from 20 µm to 2 mm, preferably 20 µm to 1 mm, preferably 20 µm to 500 µm, preferably 20 µm to 200 µm, preferably 20 µm to 100 µm, preferably 20 µm to 50 µm.

Alternatively, the slurry may be formed into a freestanding film or mat comprising the particulate material of the invention, for instance by casting the slurry onto a suitable casting template, removing the solvent and then removing the casting template. The resulting film or mat is in the form of a cohesive, freestanding mass that may then be bonded to a current collector by known methods.

The electrode of the invention may be used as the anode of a metal-ion battery. Thus, the present invention provides a rechargeable metal-ion battery comprising an anode, the anode comprising an electrode according to the invention as described above, a cathode comprising a cathode active material capable of releasing and reabsorbing metal ions; and an electrolyte between the anode and the cathode.

The metal ions are preferably lithium ions. More preferably, the rechargeable metal-ion battery of the invention is a lithium-ion battery, and the cathode active material is capable of releasing and accepting lithium ions.

The cathode active material is preferably a metal oxide-based composite. Examples of suitable cathode active materials include $LiCoO_2$, $LiCO_{0.99}Al_{0.01}O_2$, $LiNiO_2$, $LiMnO_2$, $LiCO_{0.5}Ni_{0.5}O_2$, $LiCo_{0.7}Ni_{0.3}O_2$, $LiCO_{0.8}Ni_{0.2}O_2$, $LiCO_{0.82}Ni_{0.18}O_2$, $LiCO_{0.8}Ni_{0.15}Al_{0.05}O_2$, $LiNi_{0.4}Co_{0.3}Mn_{0.3}O_2$ and $LiNi_{0.33}Co_{0.33}Mn_{0.34}O_2$. The cathode current collector is generally of a thickness of between 3 to 500 µm. Examples of materials that can be used as the cathode current collector include aluminium, stainless steel, nickel, titanium and sintered carbon.

The electrolyte is suitably a non-aqueous electrolyte containing a metal salt, e.g. a lithium salt, and may include, without limitation, non-aqueous electrolytic solutions, solid electrolytes and inorganic solid electrolytes. Examples of non-aqueous electrolyte solutions that can be used include non-protic organic solvents such as propylene carbonate, ethylene carbonate, butylene carbonates, dimethyl carbonate, diethyl carbonate, gamma butyrolactone, 1,2-dimethoxyethane, 2-methyltetrahydrofuran, dimethylsulfoxide, 1,3-dioxolane, formamide, dimethylformamide, acetonitrile, nitromethane, methylformate, methyl acetate, phosphoric acid triesters, trimethoxymethane, sulfolane, methyl sulfolane and 1,3-dimethyl-2-imidazolidinone.

Examples of organic solid electrolytes include polyethylene derivatives polyethyleneoxide derivatives, polypropylene oxide derivatives, phosphoric acid ester polymers, polyester sulfide, polyvinylalcohols, polyvinylidine fluoride and polymers containing ionic dissociation groups.

Examples of inorganic solid electrolytes include nitrides, halides and sulfides of lithium salts such as $Li_5NI_2$, $Li_3N$, $LiI$, $LiSiO_4$, $Li_2SiS_3$, $Li_4SiO_4$, $LiOH$ and $Li_3PO_4$.

The lithium salt is suitably soluble in the chosen solvent or mixture of solvents. Examples of suitable lithium salts include $LiCl$, $LiBr$, $LiI$, $LiClO_4$, $LiBF_4$, $LiBC_4O_8$, $LiPF_6$, $LiCF_3SO_3$, $LiAsF_6$, $LiSbF_6$, $LiAlCl_4$, $CH_3SO_3Li$ and $CF_3SO_3Li$.

Where the electrolyte is a non-aqueous organic solution, the metal-ion battery is preferably provided with a separator interposed between the anode and the cathode. The separator is typically formed of an insulating material having high ion permeability and high mechanical strength. The separator typically has a pore diameter of between 0.01 and 100 µm and a thickness of between 5 and 300 µm. Examples of suitable electrode separators include a micro-porous polyethylene film.

The separator may be replaced by a polymer electrolyte material and in such cases the polymer electrolyte material is present within both the composite anode layer and the composite cathode layer. The polymer electrolyte material can be a solid polymer electrolyte or a gel-type polymer electrolyte.

The invention claimed is:

1. A process for preparing composite particles, the process comprising the steps of:
   (a) providing a plurality of porous particles comprising micropores and/or mesopores, wherein the total pore volume of micropores and mesopores as measured by gas adsorption is in the range from 0.4 to 2.2 cm$^3$/g, wherein the porous particles have a PD$_{90}$ pore diameter in the range from 2.5 to 20 nm;
   (b) contacting the porous particles with a precursor of an electroactive material at a temperature effective to cause deposition of a plurality of electroactive material domains in the pores of the porous particles;
   (c) forming a plurality of modifier material domains in the pores of the porous particles and adjacent to the electroactive material domains deposited in step (b).
   (d) contacting the porous particles from step (c) with a precursor of an electroactive material at a temperature effective to cause deposition of further electroactive material domains in the pores of the porous particles from step (c) and adjacent to the modifier material domains formed in the porous particles from step (c).

2. A process according to claim 1, wherein the porous particles have a total pore volume of micropores and mesopores in the range from 0.45 to 2.2 cm$^3$/g.

3. A process according to claim 1, wherein the PD$_{50}$ pore diameter of the porous particles is no more than 15 nm.

4. A process according to claim 1, wherein the porous particles have a BET surface area in the range from 100 m$^2$/g to 4,000 m$^2$/g.

5. A process according to claim 1, wherein the porous particles are conductive porous particles, or wherein the conductive porous particles are conductive porous carbon particles, or wherein the conductive porous carbon particles comprise at least 80 wt % carbon.

6. A process according to claim 1, wherein the porous particles have a volumetric ratio of micropores to mesopores of from 90:10 to 30:70.

7. A process according to claim 1, wherein the PD$_{10}$ pore diameter of the porous particles is no more than 10 nm, and/or wherein the PD$_{90}$ pore diameter of the porous particles is no more than 15 nm.

8. A process according to claim 1, wherein the porous particles have a D$_{50}$ particle diameter in the range from 0.5 to 30 μm.

9. A process according to claim 1, wherein the electroactive material deposited in steps (b) and (d) is independently selected from silicon, tin, germanium, aluminium and mixtures and alloys thereof.

10. A process according to claim 1, wherein the electroactive material deposited in each of steps (b) and (d) is silicon.

11. A process according to claim 1, wherein the precursor of an electroactive material in each of steps (b) and (d) is independently selected from silane (SiH$_4$), disilane (Si$_2$H$_6$), trisilane (Si$_3$H$_8$), tetrasilane (Si$_4$H$_{10}$), methylsilane, dimethylsilane and chlorosilanes.

12. A process according to claim 1, wherein steps (b) and (d) are independently carried out at a temperature in the range from 300 to 800° C.

13. A process according to claim 1, wherein step (b) and/or step (d) further comprises separating by-products from the particles.

14. A process according to claim 1, wherein step (c) comprises contacting the porous particles from step (b) with a passivating agent, optionally wherein the passivating agent is selected from (i) an oxygen containing gas; (ii) ammonia; (iii) a gas comprising ammonia and oxygen; (iv) phosphine, (v) R$^1$—CH=CH—R$^1$; (vi) R$^1$—C≡C—R$^1$; (vii) O=CR$^1$R$^1$; (viii) HX—R$^2$, and (ix) HX—C(O)—R$^1$,
   wherein X represents O, S, NR$^1$ or PR$^1$; and
   wherein each R$^1$ independently represents H or an unsubstituted or substituted aliphatic or aromatic hydrocarbyl group having from 1 to 20 carbon atoms, or wherein two R$^1$ groups form an unsubstituted or substituted ring structure comprising from 3 to 8 carbon atoms in the ring;
   wherein R$^2$ represents an unsubstituted or substituted aliphatic or aromatic hydrocarbyl group having from 1 to 20 carbon atoms, or wherein R$^1$ and R$^2$ together form an unsubstituted or substituted ring structure comprising from 3 to 8 carbon atoms in the ring.

15. A process according to claim 14, wherein the passivating agent is selected from the group consisting of ethylene, propylene, 1-butene, butadiene, 1-pentene, 1,4-pentadiene, 1-hexene, 1-octene, styrene, divinylbenzene, acetylene, phenylacetylene, norbornene, norbornadiene and bicyclo [2.2.2] oct-2-ene.

16. A process according to claim 1, wherein step (c) comprises contacting the porous particles from step (b) with a carbon-containing precursor at a temperature effective to cause deposition of a pyrolytic carbon material in the pores of the porous particles.

17. A process according to claim 1, wherein after step (d), additional steps of;
   forming a plurality of modifier material domains in the pores of the porous particles and adjacent to the electroactive material domains; and
   contacting the porous particles with a precursor of an electroactive material at a temperature effective to cause deposition of further electroactive material domains in the pores of the porous particles and adjacent to the modifier material domains are repeated one or more times.

18. A process according to claim 1, further comprising the step of:
   (e) forming a plurality of modifier material domains in the pores and/or on the outer surface of the porous particles from step (d), optionally
   wherein step (e) comprises contacting the surface of the porous particles from the final step (d) with a passivating agent, optionally wherein the passivating agent is as defined in claim 14, and/or
   wherein step (e) comprises combining the porous particles from step (d) with a pyrolytic carbon precursor; and heating the pyrolytic carbon precursor to a temperature effective to cause the deposition of a pyrolytic conductive carbon material into the pores and/or onto the outer surface of the porous particles.

19. A process according to claim 1, wherein the porous particles have a particle size distribution span $(D_{90}-D_{10})/D_{50})$ of 5 or less.

20. A process according to claim 10, wherein the electroactive material is silicon; and
- no more than 10 wt % of the silicon deposited is coarse bulk silicon as determined by thermogravimetric analysis; and/or
- at least 20 wt %, of the silicon deposited is surface silicon as determined by thermogravimetric analysis.

* * * * *